(12) United States Patent
Hachiya et al.

(10) Patent No.: US 10,348,230 B2
(45) Date of Patent: Jul. 9, 2019

(54) CONTROL DEVICE FOR AC ROTARY MACHINE AND MAGNETIC-POLE-POSITION CORRECTION AMOUNT CALCULATION METHOD

(71) Applicant: Mitsubishi Electric Corporation, Chiyoda-ku (JP)

(72) Inventors: Yosuke Hachiya, Chiyoda-ku (JP); Kunihiro Kawahara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 274 days.

(21) Appl. No.: 15/323,979

(22) PCT Filed: Jul. 2, 2015

(86) PCT No.: PCT/JP2015/069102
§ 371 (c)(1),
(2) Date: Jan. 5, 2017

(87) PCT Pub. No.: WO2016/038992
PCT Pub. Date: Mar. 17, 2016

(65) Prior Publication Data
US 2017/0201200 A1 Jul. 13, 2017

(30) Foreign Application Priority Data
Sep. 12, 2014 (JP) .................. 2014-185863

(51) Int. Cl.
*H02P 21/16* (2016.01)
*H02P 6/30* (2016.01)
(Continued)

(52) U.S. Cl.
CPC ............ *H02P 21/18* (2016.02); *G01D 18/00* (2013.01); *H02P 6/16* (2013.01); *H02P 6/18* (2013.01);
(Continued)

(58) Field of Classification Search
CPC .................................. H02P 6/18; H02P 21/20
See application file for complete search history.

(56) References Cited

U.S. PATENT DOCUMENTS 6,396,229 B1 * 5/2002 Sakamoto ................ H02P 6/18
318/400.02
8,395,339 B2 * 3/2013 Kato ....................... H02P 21/26
318/400.33
(Continued)

FOREIGN PATENT DOCUMENTS

JP    2001-95281 A    4/2001
JP    3312472 B2      8/2002
(Continued)

OTHER PUBLICATIONS

International Search Report dated Sep. 15, 2015 in PCT/JP2015/069102 filed Jul. 2, 2015.

*Primary Examiner* — Bickey Dhakal
*Assistant Examiner* — Charles S Laughlin
(74) *Attorney, Agent, or Firm* — Oblon, McClelland, Maier & Neustadt, L.L.P.

(57) ABSTRACT

A control device for an AC rotary machine includes a magnetic-pole-position correction amount calculation device that calculates a magnetic-pole-position correction amount based on a detection-current vector detected when a voltage application device applies a voltage to the AC rotary machine according to a voltage command and on the voltage command, and stores in a storage device the magnetic-pole-position correction amount as it is associated with the detection-current vector. At normal operation of the AC rotary machine, a voltage-vector command generation device generates a voltage command for normal operation based on the detection-current vector detected by a current
(Continued)

vector detection device and the magnetic-pole-position correction amount associated with the detection-current vector.

20 Claims, 12 Drawing Sheets

(51) Int. Cl.

| | | |
|---|---|---|
| *B60L 15/20* | (2006.01) | |
| *H02P 21/18* | (2016.01) | |
| *H02P 6/18* | (2016.01) | |
| *G01D 18/00* | (2006.01) | |
| *H02P 27/08* | (2006.01) | |
| *H02P 6/16* | (2016.01) | |
| *G01D 5/20* | (2006.01) | |

(52) U.S. Cl.
CPC ............... *H02P 27/08* (2013.01); *G01D 5/20* (2013.01); *H02P 6/183* (2013.01)

(56) References Cited

U.S. PATENT DOCUMENTS

| | | |
|---|---|---|
| 2001/0009359 A1 | 7/2001 | Kinpara et al. |
| 2004/0113582 A1 | 6/2004 | Ide |
| 2014/0340018 A1 | 11/2014 | Hachiya et al. |

FOREIGN PATENT DOCUMENTS

| | | |
|---|---|---|
| JP | 3882728 B2 | 2/2007 |
| JP | 4271397 B2 | 6/2009 |
| JP | 2010-163872 A | 7/2010 |
| JP | 4687846 B2 | 5/2011 |
| JP | 5126080 B2 | 1/2013 |
| JP | 2014-117069 A | 6/2014 |
| WO | 2013/114688 A1 | 8/2013 |

* cited by examiner

CONTROL DEVICE FOR AC ROTARY MACHINE AND MAGNETIC-POLE-POSITION CORRECTION AMOUNT CALCULATION METHOD

TECHNICAL FIELD

The present invention relates to a control device for AC rotary machine, which can control a rotor positon of an AC rotary machine such as a synchronous machine, a SynRM (Synchronous Reluctance Motor) or the like, without using a positon sensor.

BACKGROUND ART

Vector control is widely known as a method that can highly-accurately control an AC rotary machine. In the vector control of the AC rotary machine, since the AC rotary machine is rotated with an intended power or number of rotations, its control has been usually performed such that a rotor position (rotor's magnetic-pole position) or rotor speed of the AC rotary machine is acquired using a speed sensor or a position sensor. However, these sensors are disadvantageous from the aspect of their fault-tolerance or maintenance. Accordingly, a method is used in which the rotor's magnetic-pole position or rotation speed of the AC rotary machine is detected without using any sensor. As this method, an induced-voltage based method is publicly known, which is advantageous mainly in operations in a high speed region where the induced voltage is large. On the other hand, with respect to a speed region including a zero speed or a low speed region, where the induced voltage is difficult to be used, such a technique is known in which a voltage or current with a frequency different to the fundamental frequency is overlapped to the AC rotary machine, and using inductance saliency obtained thereby, the rotor's magnetic-pole position is estimated (for example, Patent Document 1).

However, in general, according to the method in which the rotor's magnetic-pole position is estimated using inductance saliency, there is a problem that, when a large current flows through the AC rotary machine, an error occurs in the estimated rotor's magnetic-pole position due to effect of magnetic saturation in inductance. Influence of this positional error results in degraded controllability, such as deteriorated accuracy in the determined position at the position determination control, or deteriorated responsivity for controlling the speed.

Methods for solving this problem are described in Patent Document 2. In Patent Document 2, there are disclosed: a method in which a high-frequency alternating voltage is applied to an AC rotary machine, a high-frequency current value obtained thereby is converted into d-q-axis coordinates according to the phases shifted by 45 degrees from an estimated angle, and using high-frequency impedances Zdm and Zqm obtained thereby, a rotor's magnetic-pole position is estimated so that these impedances become matched to each other; and a method in which, in order to make correction under high load, a compensation angle $\theta r\hat{}$ resulting from multiplying a torque component $i\delta^*$ as a current command value by a proportional constant $K\theta$, is subtracted from a magnetic-pole position $\theta\hat{}$ having been estimated, to thereby calculate an estimated position $\theta c\hat{}$.

Further, in Patent Document 3, there are disclosed: a method in which a correction angle $\theta cr$ is calculated so that a length $vh^*$ of a voltage-command spatial vector becomes matched to a target $vh^{**}$ of a voltage vector length determined by a function $fv(T^*)$ related to a target torque $T^*$; and a method in which, in order to make correction under high load, the correction angle $\theta cr$ is added to a calculated and estimated rotor's magnetic-pole position.

CITATION LIST

Patent Document

Patent Document 1: Japanese Patent No. 3312472 (Paragraphs 0010 to 0011, FIG. 1)
Patent Document 2: Japanese Patent No. 4687846 (Paragraph 0024, Paragraphs 0027 to 0035, FIG. 1)
Patent Document 3: Japanese Patent No. 3882728 (Paragraphs 0021 to 0024, FIG. 2, FIG. 6)

SUMMARY OF THE INVENTION

Problems to be Solved by the Invention

According to any one of the methods in Patent Documents 2 and 3, in order to correct an estimation error that occurs in the rotor's magnetic-pole position under high load, the compensation angle $\theta r\hat{}$ or the correction angle $\theta cr$ is used to correct the rotor's magnetic-pole position having been estimated, so that the controllability of the AC rotary machine is allegedly enhanced. Such a compensation angle or correction angle is a correction amount for correcting the estimation error in the rotor's magnetic-pole position, so that, hereinafter, also in the description of the conventional art, the compensation angle or correction angle is referred to as a magnetic-pole-position correction amount. It should be noted here that the magnetic-pole-position correction amount has to be measured in advance before the AC rotary machine is driven. Although there is no mention about any specific measuring method in Patent Documents 2 and 3, it is generally conceivable to connect the AC rotary machine as a control target to a load device and then to actually measure the magnetic-pole-position correction amount while applying a rotary machine current to that real machine. Instead, in order to save effort of performing the measurement using the real machine, it is also conceivable to calculate the magnetic-pole-position correction amount by electromagnetic analysis.

According to these methods, however, in order to apply the rotary machine current to the AC rotary machine provided as the target, the AC rotary machine has to be connected to the load device, so that, in a state of the AC rotary machine being already incorporated in a mechanical apparatus, it is unable to connect the machine to the road device and thus unable to measure in advance the magnetic-pole-position correction amount. In this regard, if the electromagnetic analysis is used, the measurement using the real machine is unnecessary; however, it is unable to apply this method to an AC rotary machine whose internal structure is unknown, meaning that it is imperative to perform the measurement after connecting the AC rotary machine to the load device. Accordingly, for such an AC rotary machine, it is unable to calculate the magnetic-pole-position correction amount and thus unable to enhance the controllability of the AC rotary machine.

This invention has been made to solve these problems, and an object thereof is to achieve a control device for AC rotary machine, which can calculate the magnetic-pole-position correction amount for correcting a magnetic-pole position error that occurs under application of a rotary machine current, without the AC rotary machine being connected to the load device, and which can enhance the controllability of the AC rotary machine by controlling it based on a control command in which the rotor's magnetic-pole position having been estimated is corrected using the magnetic-pole-position correction amount.

Means for Solving the Problems

A control device for AC rotary machine of the invention is characterized by comprising: a voltage-vector command generation device that generates a voltage command for controlling an AC rotary machine; a voltage application device that applies a voltage to the AC rotary machine, based on the voltage command; a current vector detection device that detects a detection-current vector whose component is a rotary machine current flowing through the AC rotary machine; a magnetic-pole-position correction amount calculation device that, at the time of correction-amount-generation operation of the AC rotary machine that is different to normal operation thereof, calculates a magnetic-pole-position correction amount for correcting a magnetic-pole position error that corresponds to a difference between an estimated position that is an estimated magnetic-pole position of a rotor of the AC rotary machine corresponding to the voltage command, and a magnetic-pole position of the rotor when the AC rotary machine is driven based on the voltage command; wherein, at the time of said correction-amount-generation operation, the voltage-vector command generation device successively generate a first said voltage command for causing a target current to flow through the AC rotary machine, and a second said voltage command that is a voltage command for applying a voltage to the AC rotary machine in a state where a current is flowing through the AC rotary machine according to the first voltage command, in order to calculate the magnetic-pole position correction amount in the state where the current is flowing through the AC rotary machine according to the first voltage command; and wherein, the magnetic-pole-position correction amount calculation device calculates the magnetic-pole-position correction amount, based on the first voltage command and the second voltage command, and on the detection-current vector that is detected when voltages according to the first voltage command and the second voltage command are applied.

Effect of the Invention

The control device for AC rotary machine of the invention can calculate the magnetic-pole-position correction amount for correcting the magnetic-pole position error that occurs under application of the rotary machine current, without the AC rotary machine being connected to a load device, and can enhance the controllability of the AC rotary machine by controlling it based on a control command in which the magnetic-pole position of the rotor having been estimated is corrected using the magnetic-pole-position correction amount, because at the time of said correction-amount-generation operation, the voltage-vector command generation device successively generate a first said voltage command for causing a target current to flow through the AC rotary machine, and a second said voltage command that is a voltage command for applying a voltage to the AC rotary machine in a state where a current is flowing through the AC rotary machine according to the first voltage command, in order to calculate the magnetic-pole position correction amount in the state where the current is flowing through the AC rotary machine according to the first voltage command, and wherein, the magnetic-pole-position correction amount calculation device calculates the magnetic-pole-position correction amount, based on the first voltage command and the second voltage command, and on the detection-current vector that is detected when voltages according to the first voltage command and the second voltage command are applied.

MODES FOR CARRYING OUT THE INVENTION

Embodiment 1

In this embodiment, as the voltage command used for calculating a magnetic-pole-position correction amount for an AC rotary machine under load (under application of a rotary machine current), a first voltage command and a second voltage command are applied. The first command is a voltage command for inducing magnetic saturation in the AC rotary machine, and the second voltage command is a voltage command for calculating the magnetic-pole-position correction amount. Sequential application of the first voltage command and the second voltage command makes it possible to calculate the magnetic-pole-position correction amount under magnetic saturation, with an application of current in a very short time and without rotating the AC rotary machine. Description will be made about a control device for AC rotary machine which can calculates the magnetic-pole-position correction amount in the above manner, even in a state where the AC rotary machine can not be connected to a load device because of being connected to a mechanical apparatus, for example, to thereby enhance the sensorless controllability of the rotary machine. It is noted that, where appropriate, the AC rotary machine will be referred to simply as a rotary machine.

Figure 1:
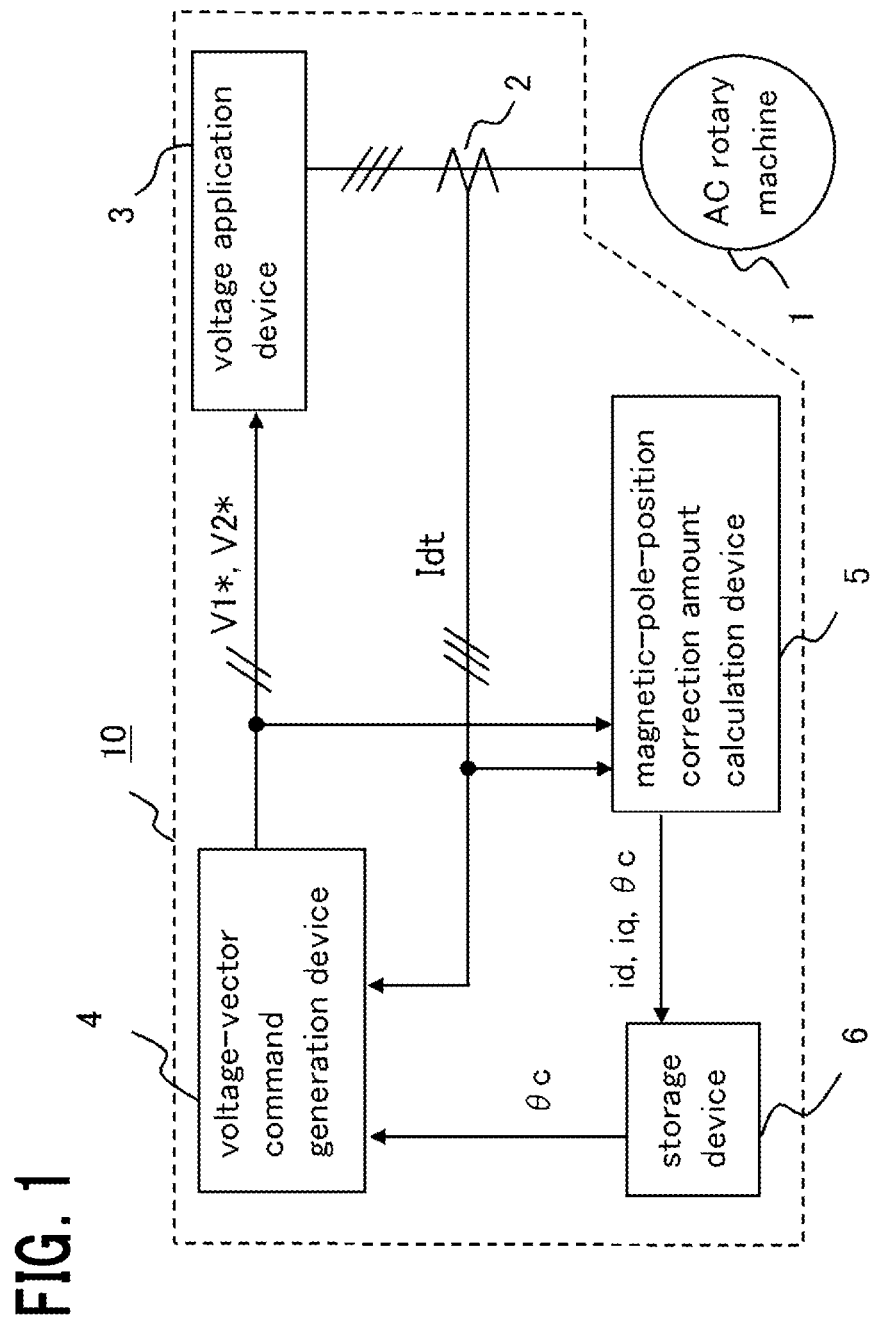
FIG. 1 is a diagram showing a configuration of a control device for AC rotary machine according to Embodiment 1 of the invention.
Figure 2:
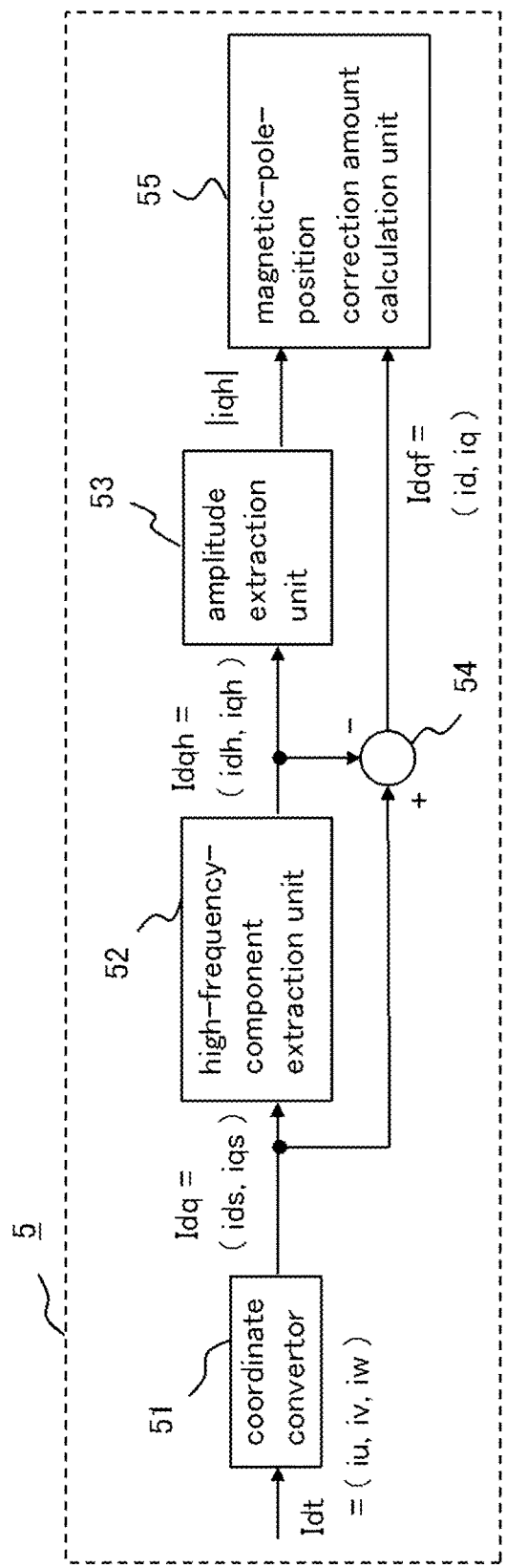
FIG. 2 is a diagram showing a configuration of a magnetic-pole-position correction amount calculation device in FIG. 1.
Figure 3:
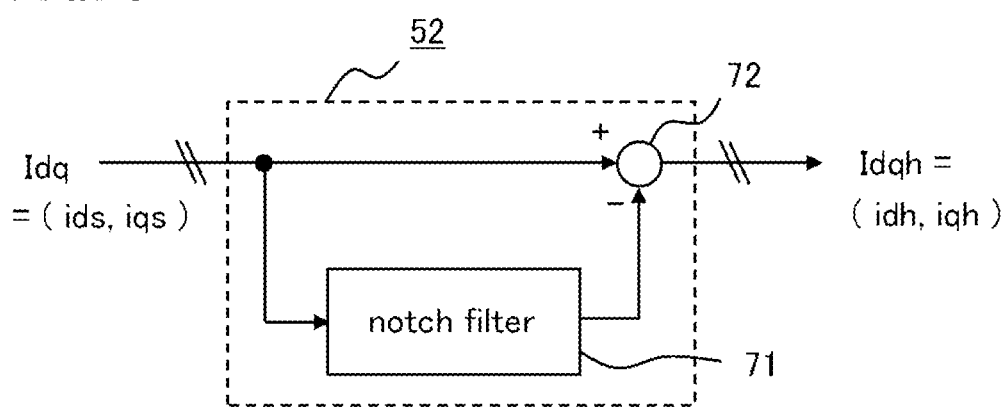
FIG. 3 is a diagram showing a configuration of a high-frequency-component extraction unit in FIG. 2.
Figure 4:
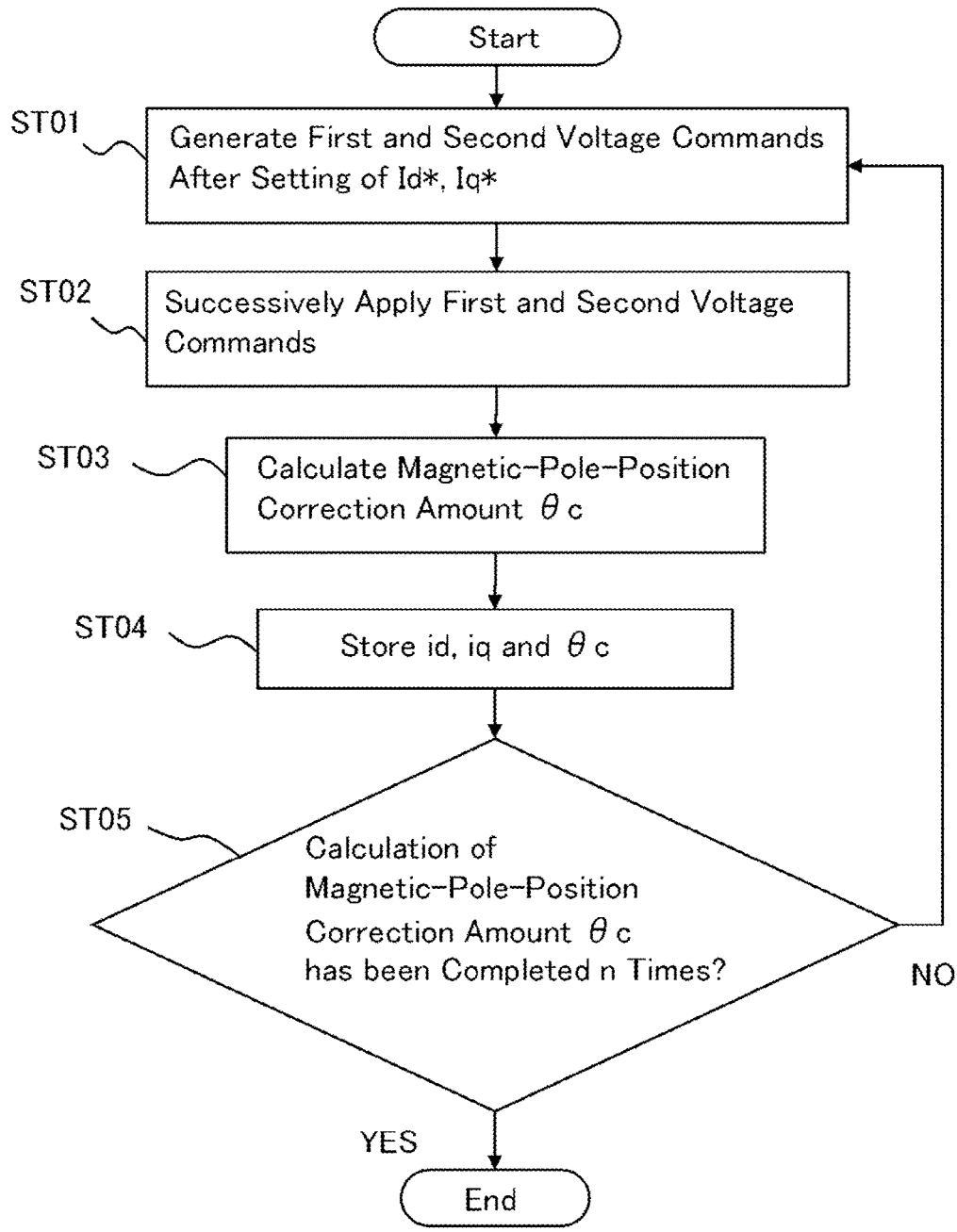
FIG. 4 is a flowchart showing magnetic-pole-position correction amount calculation processing by the control device for AC rotary machine according to Embodiment 1 of the invention.

FIG. 1 is a diagram showing a configuration of a control device for AC rotary machine according to Embodiment 1 of the invention. FIG. 2 is a diagram showing a configuration of a magnetic-pole-position correction amount calculation device in FIG. 1, and FIG. 3 is a diagram showing a configuration of a high-frequency-component extraction unit in FIG. 2. FIG. 4 is a flowchart showing magnetic-pole-position correction amount calculation processing by the control device for AC rotary machine according to Embodiment 1 of the invention.

An AC rotary machine 1 is a synchronous motor which is herein a synchronous machine using permanent magnet. In this embodiment, although description will be made citing the synchronous motor as an example, even if it is another type of rotary machine, it is allowable to configure the control device using the same principle.

A control device for AC rotary machine 10 includes a current vector detection device 2, a voltage application device 3, a voltage-vector command generation device 4, a magnetic-pole-position correction amount calculation device 5 and a storage device 6. To the AC rotary machine 1 are connected: the current vector detection device 2 that detects a current vector of the AC rotary machine 1; and the voltage application device 3 that corresponds to a power convertor, such as an inverter, etc., and applies a voltage to the AC rotary machine 1.

The current vector detection device 2 detects three-phase currents iu, iv, iw that are each a rotary machine current of the AC rotary machine 1, to thereby output a detection-current vector Idt. The components of the detection-current vector Idt are the three-phase currents iu, iv, iw. For the detection of the three-phase currents iu, iv, iw, it is allowable, other than to detect the currents of all three phases, to detect those of two phases and then to determine the three-phase currents iu, iv, iw by utilizing the fact that the sum of the three-phase currents iu, iv, iw is zero, or to calculate the three-phase currents iu, iv, iw from the states of an inverter-bus current or switching-element flowing currents and the switching elements. The voltage application device 3 applies a voltage to the AC rotary machine 1, based on a voltage vector command outputted from the voltage-vector command generation device 4. The voltage-vector command generation device 4 outputs, when the AC rotary machine 1 is put into normal operation, a voltage vector command to be used for the normal operation to the voltage application device 3, and outputs, when the magnetic-pole-position correction amount is to be calculated, a first voltage command vector V1* and a second voltage command vector V2* to the voltage application device 3. The components of the first voltage command vector V1* are Vd1* and Vq1* to be described later. The components of the second voltage command vector V2* are Vd2* and Vq2* to be described later.

Prior to describing the configurations of the voltage-vector command generation device 4 and the magnetic-pole-position correction amount calculation device 5, an estimation error will be described that is a problem before the present invention and that occurs in the estimation of a rotor's magnetic-pole position using a high-frequency voltage, at the time of voltage application, namely, at the time the AC rotary machine 1 is driven by the application of the rotary machine current. It is noted that, where appropriate, the rotor's magnetic-pole position will be referred to simply as a magnetic-pole position.

Figure 5:
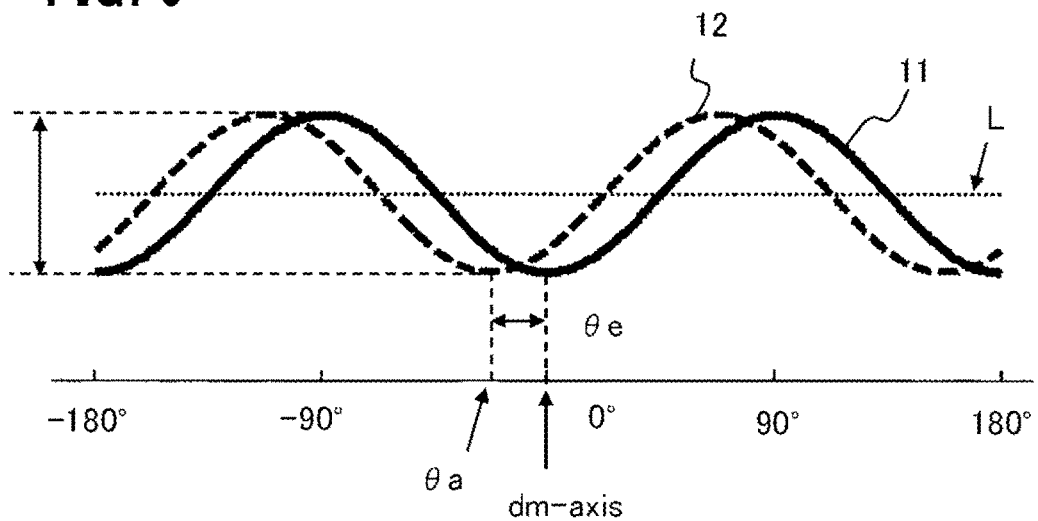
FIG. 5 is a diagram showing a variation in inductance distribution of an AC rotary machine under application of a rotary machine current.

FIG. 5 is a diagram showing a variation in inductance distribution of an AC rotary machine under application of the rotary machine current, which is a diagram in which shown is the inductance distribution in one cycle of the electrical angle when the position of the N-pole as a rotor's magnetic pole is defined as an original point. In FIG. 5, the abscissa represents a position (electrical angle) in the AC rotary machine 1, and the ordinate represents an inductance. Under no load, as shown by an inductance distribution 11 indicated by a sold line, such an inductance distribution is provided in which the inductance varies at a frequency twice the cycle of the electrical angle of the rotary machine such that the inductance at the rotor's magnetic-flux axis (hereinafter, referred to as dm-axis) is lowest, and the inductance at the position (hereinafter, referred to as qm-axis) advanced by ±90 degrees from the magnetic-pole position (dm-axis) is highest. In the method of abovementioned estimation of the magnetic-pole position by the application of the high-frequency voltage, the voltage with a frequency that is different to the rotary-machine driving frequency is overlapped and a difference in inductance (saliency) resulting thereby is detected, so that the magnetic-pole position is estimated. However, when the rotary machine current is applied to the rotary machine, magnetic saturation is induced inside the rotary machine. Thus, as shown in an inductance distribution 12 indicated by a broken line, the inductance distribution is changed to have a waveform displaced by an angle θe, so that the estimated magnetic-pole position will be displaced by the angle θe like the inductance distribution.

Accordingly, in the magnetic-pole-positon estimation method using inductance saliency, it is necessary to correct the obtained estimated magnetic-pole positon by the displacement angle θe, when the rotary machine current emerges. Note that, since the displacement angle θe varies depending on the magnitude of the rotary machine current, it is necessary to perform measuring of correction amounts by changing the magnitude of the rotary machine current into multiple patterns. However, when a large rotary machine current is caused to flow, torque is generated in the AC rotary machine due to a current in a direction in which torque is generated in the AC rotary machine (torque current), which results in unexpectedly increased rotation speed, for example. Thus, heretofore, in the conventional measurement of them, it is necessary to connect to a load device the rotary machine that is provided with a position detector for experimental purpose, to thereby measure each difference between a value of estimated magnetic-pole position and that of the position detector while changing the rotary machine current into multiple patterns, after making the AC rotary machine constant in the speed or locked, by controlling the speed constantly using the load device, or by positionally controlling the AC rotary machine so that the machine is locked or by using a fixing jig.

In order to calculate magnetic-pole-position correction amounts when the rotary machine current is applied while being changed into multiple patterns, this embodiment is characterized in that: the first voltage command to be applied for causing a rotary machine current to flow instantaneously to thereby induce magnetic saturation in the AC rotary machine and the second voltage command for calculating each magnetic-pole-position correction amount after inducement of the magnetic saturation in the AC rotary machine according to the application of the first voltage command, are successively applied; wherein the torque to be generated in the AC rotary machine when the respective voltage commands are applied thereto is suppressed as much as possible in such a manner that the application time for each of the voltage commands is made short; whereby the speed of the AC rotary machine is prevented from increasing unexpectedly, and each magnetic-pole-position estimation error (estimated magnetic-pole error θe) at the driving of the AC rotary machine 1 is calculated without using a load device. The magnetic-pole-position estimation error (estimated magnetic-pole error θe) corresponds to the displacement angle θe illustrated in FIG. 5. The control device for AC rotary machine 10 can output to the voltage application device 3, a voltage command corrected using the magnetic-pole-position estimation error (estimated magnetic-pole error θe) as a magnetic-pole-position correction amount θc, to thereby control the AC rotary machine 1 highly accurately.

Description will be made about the operations of the voltage-vector command generation device 4 and the magnetic-pole-position correction amount calculation device 5, for calculating the magnetic-pole-position estimation error (estimated magnetic-pole error θe). First, a generation method of the voltage commands by the voltage-vector command generation device 4 and a calculation method of the correction amount based on the voltage commands will be described. Then, specific operations of this embodiment by the magnetic-pole-position correction amount calculation device 5 will be described.

The voltage-vector command generation device 4 generates the first voltage command and the second voltage command successively. In the following, a voltage-command calculation method for the first voltage command and a voltage-command-based correction-amount calculation principle using the voltage command will be described.

The first voltage command is a voltage command for inducing magnetic saturation in the AC rotary machine 1. As described previously, with respect to the estimated magnetic-pole error θe and the magnetic-pole-position correction amount θc, the degree of magnetic saturation varies depending on the magnitude of a rotary machine current applied to the AC rotary machine 1. Thus, it is an essential requirement that the first voltage command be such a voltage command that causes a current necessary to induce magnetic saturation in the AC rotary machine to flow therethrough. In order to measure a change in the degree of magnetic saturation, a current is causes to flow in one direction through the AC rotary machine 1, and the estimated magnetic-pole error θe and the magnetic-pole-position correction amount θc are calculated plural times while the amount of the current is changed. Here, a target rotary machine current is defined as a target current vector Idq* and the components of the target current vector Idq* are defined as a d-axis target current value Id* and a q-axis target current value Iq*. When a current loop is established employing, for example, proportional-integral control using dp-axis currents as shown in a formula (1), magnetic saturation can be induced when the target rotary machine current with that values is applied.

$$V_d^* = k_{cdp}\left(1 + \frac{k_{cdi}}{s}\right)(I_d^* - I_d) \quad (1)$$

$$V_q^* = k_{cqp}\left(1 + \frac{k_{cqi}}{s}\right)(I_q^* - I_q)$$

Here, Vd* is a d-axis voltage command and Vq* is a q-axis voltage command, so that (Vd*, Vq*) denotes a dp-axis voltage command vector; Id is a d-axis detection current value and Iq is a q-axis detection current value, so that (Id, Iq) denotes a dq-axis detection current vector; kcdp is a proportional constant for d-axis current control and kcqp is a proportional constant for q-axis current control; and kcdi is an integral constant for d-axis current control and kcqi is an integral constant for q-axis current control.

According to this method, however, it takes long time for the step by the number of control cycles, until the current value converges to a desired value, so that there are cases where the AC rotary machine 1 causes unintentional rotation due to a torque current flowing during that time. For that reason, in this embodiment, a voltage command for causing a current to flow with an intended value has been calculated beforehand, and a voltage is applied from the voltage application device 3 on the basis of the voltage command. This makes it possible to apply a current of intended amount to the AC rotary machine 1 by a short step, to thereby suppress the rotation of the AC rotary machine 1.

Description will be made about a calculation method of the voltage command for applying the d-axis target current value Id* and the q-axis target current value Iq* that are the target current values. A voltage equation of the synchronous motor on the dp-axis can be represented by a formula (2).

$$\begin{bmatrix} V_d \\ V_q \end{bmatrix} = \begin{bmatrix} R + \frac{d}{dt}L_d & -\omega_r L_q \\ \omega_r L_d & R + \frac{d}{dt}L_q \end{bmatrix} \begin{bmatrix} I_d \\ I_q \end{bmatrix} + \begin{bmatrix} 0 \\ \omega_r \phi_f \end{bmatrix} \quad (2)$$

Note that R is an armature resistance, φf is a magnetic flux of the magnet, and Ld, Lq are inductances in the d-axis and q-axis, respectively, and they can be set beforehand.

The relationship between the first voltage command vector V1* outputted by the voltage-vector command generation device 4 and the target current vector Idq* is derived using the formula (2). When the first voltage values in the first voltage command vector V1* outputted by the voltage-vector command generation device 4, namely, the first voltage commands Vd1*, Vq1* in the d-axis and q-axis are assigned to Vd and Vq in the formula (2), the d-axis target current value Id* and the q-axis target current value Iq* in the target current vector Idq* are assigned to Id and Iq in the formula (2), and ωr=0 is substituted into the formula in view of which the AC rotary machine 1 is not rotated (ωr≈0), the first voltage command vector V1* can be represented by a formula (3).

$$\begin{bmatrix} V_{d1}^* \\ V_{q1}^* \end{bmatrix} = \begin{bmatrix} RI_d^* + \frac{d}{dt}L_d I_d^* \\ RI_q^* + \frac{d}{dt}L_q I_q^* \end{bmatrix} \quad (3)$$

When the voltage command calculated from the formula (3) is used as the first voltage command and the application time of the first voltage command is reduced, it is possible to make shorter the generation time of a torque current to thereby suppress the generation of the torque current. The first voltage command in Embodiment 1 is the first voltage command vector V1* having two components, and the components of the first voltage command vector V1* are the d-axis voltage command Vd1* and the q-axis voltage command Vq1*. The foregoing is the generation method of the first voltage command.

The second voltage command is a voltage command for calculating the correction amount for the estimated magnetic-pole position, and in this embodiment, the voltage command is used that is provided with a frequency $\omega h$ that is higher than the driving frequency of the AC rotary machine 1, and a high-frequency voltage amplitude Vh, and that is bidirectional and has a phase difference of 180° with respect to the d-axis that is the magnetic-pole axis of the AC rotary machine. Thus, with respect to the d-axis in the second voltage command, a value in one direction is provided as a positive one, and a value in the other direction is provided as a negative one. Further, the bidirectional phase difference of the second voltage command is not limited to 180°, and may be in a range of value more than 90° but less than 270°. Namely, it suffices to include, in one direction in the second voltage command, a component that has a phase difference of 180° relative to that in the other direction in the second voltage command. Note that, such a bidirectional voltage having a phase difference of 180° is referred to as alternation. In this embodiment, assuming that the second voltage command is the second voltage command vector V2* having two components, these components are defined as a d-axis voltage command Vd2* and a q-axis voltage command Vq2*, which are given by a formula (4).

$$\begin{bmatrix} V_{d2}^* \\ V_{q2}^* \end{bmatrix} = \begin{bmatrix} V_h \sin\omega_h t \\ 0 \end{bmatrix} \quad (4)$$

Figure 6:
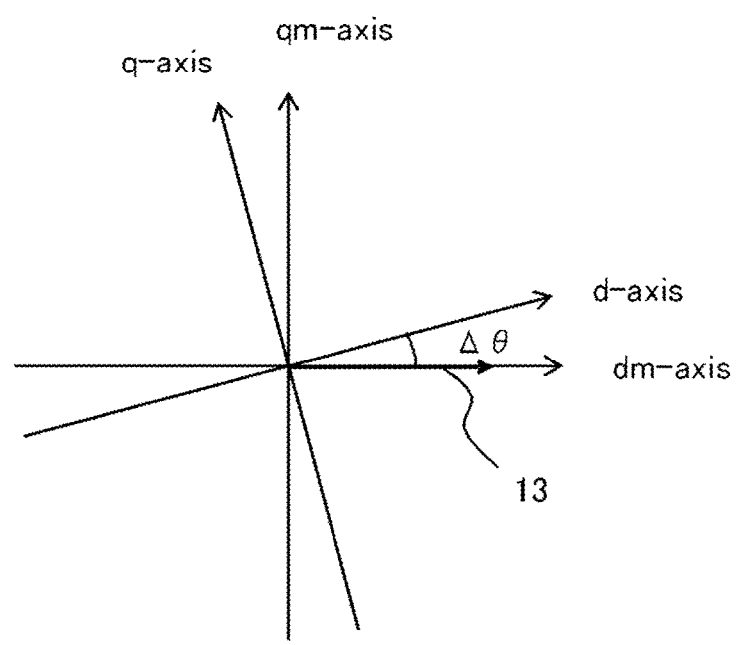
FIG. 6 is a diagram showing directions of vectors of a rotor's magnetic flux and an applied voltage command, according to Embodiment 1 of the invention.

The second voltage command causes an alternating voltage corresponding to at least one cycle of the frequency $\omega h$ to be applied in the d-axis, when a current is flowing through the AC rotary machine because of the application of the first voltage command, namely, in a state where the AC rotary machine is magnetically saturated and then, from the detection-current vector Idt obtained on that occasion, the magnetic-pole-position correction amount calculation device 5 calculates the magnetic-pole-position correction amount θc. The direction in which the second voltage command vector V2* is applied is a d-axis direction shown in FIG. 6. FIG. 6 is a diagram showing directions of vectors of the rotor's magnetic flux and the applied voltage command, according to Embodiment 1 of the invention. As shown in FIG. 6, it is assumed that the direction of a rotor's magnetic-flux vector 13 corresponds to the dm-axis, the direction perpendicular thereto corresponds to the qm-axis, the direction in which the voltage command vector V2* is applied corresponds to the d-axis, and the direction perpendicular thereto corresponds to the q-axis. Further, the deviation between the d-axis and the dm-axis is Δθ.

Here, description will be made about the principle for calculating the magnetic-pole-position correction amount θc. The voltage command vector V2* for causing alternation in the d-axis is a high-frequency voltage command vector Vdqh. The components of the high-frequency voltage command vector Vdqh are high-frequency voltage commands vdh and vqh. The high-frequency voltage command vdh is a d-axis high-frequency voltage command and the high-frequency voltage command vqh is a q-axis high-frequency voltage command. Description will be made about an equation of vector of a current flowing through the AC rotary machine 1 when the high-frequency voltage commands vdh, vqh are applied.

When the high-frequency voltage command vector Vdqh is applied to the d-axis, the equation for the AC rotary machine 1 can be expressed as a formula (5). In the formula (5), p is a differential operator. Note that, as described previously, it is assumed that, under application of a certain rotary machine current, magnetic saturation is induced in the AC rotary machine 1, and when a certain rotary machine current flows therethrough, the estimated magnetic-pole error θe occurs.

$$\begin{bmatrix} v_{dh} \\ v_{qh} \end{bmatrix} = \begin{bmatrix} R + pL_{dc} - \omega_r L_{dqc} & pL_{dqc} - \omega_r L_{qc} \\ pL_{dqc} + \omega_r L_{dc} & R + pL_{qc} + \omega_r L_{dqc} \end{bmatrix} \begin{bmatrix} i_{dh} \\ i_{qh} \end{bmatrix} + \omega_r \phi_f \begin{bmatrix} -\sin\Delta\theta \\ \cos\Delta\theta \end{bmatrix} \quad (5)$$

Note that Ldc, Lqc, Ldqc, L and l are defined as follows.

$Ldc = L - l \cos 2(\Delta\theta - \theta e)$ $Lqc = L + l \cos 2(\Delta\theta - \theta e)$ $Ldqc = l \sin 2(\Delta\theta - \theta e)$ $L = (Ld + Lq)/2$ $l = (Ld - Lq)/2$ Here, R is an armature resistance of the AC rotary machine 1, Ld is an inductance in the direction of the dm-axis and the Lq is an inductance in the direction of the qm-axis; Δθ is a deviation resulting from subtraction of the position (electrical angle) of the d-axis from the position (electrical angle) of the dm-axis, $\omega r$ is a rotation speed, and $\phi f$ is a magnitude of rotor's magnetic-flux vector; idh is a d-axis high-frequency current and iqh is a q-axis high-frequency current. Note that, where appropriate, idh and iqh are each referred to as high-frequency current by the omission of "d-axis" and "q-axis". With respect to another voltage/current name, where appropriate, its abbreviated name without "d-axis" or "q-axis" is also used.

Because the AC rotary machine 1 is caused not to rotate (rotation speed $\omega r \approx 0$), the AC rotary machine 1 is assumed to be in a stopping state and thus the rotation speed $\omega r = 0$ is assigned, so that a formula (6) can be obtained from the formula (5).

$$\begin{bmatrix} v_{dh} \\ v_{qh} \end{bmatrix} = R \begin{bmatrix} i_{dh} \\ i_{qh} \end{bmatrix} + p \begin{bmatrix} L_{dc} & L_{dqc} \\ L_{dqc} & L_{qc} \end{bmatrix} \begin{bmatrix} i_{dh} \\ i_{qh} \end{bmatrix} \quad (6)$$

Furthermore, it is assumed that the high-frequency voltage command vector Vdqh is given as the second voltage command vector by the formula (4). The right-side second term in the formula (6) corresponds to the differentiation of the high-frequency current, and the high-frequency current is differentiated in a manner multiplied by the angular frequency ωh of the high-frequency voltage, so that the right-side second term becomes much larger than the right-side first term (the right-side second term ≫ the right-side first term) and thus, the right-side first term can be neglected. As a result, it is possible to obtain a formula (7) by modifying the formula (6).

$$p\begin{bmatrix} i_{dh} \\ i_{qh} \end{bmatrix} = \frac{1}{L^2 - l^2} \begin{bmatrix} L + l\cos 2(\Delta\theta - \theta_e) & -l\sin 2(\Delta\theta - \theta_e) \\ -l\sin 2(\Delta\theta - \theta_e) & L - l\cos 2(\Delta\theta - \theta_e) \end{bmatrix} \begin{bmatrix} V_h \sin \omega_h t \\ 0 \end{bmatrix} \quad (7)$$

When both sides of the formula (7) are integrated, the high-frequency current vector Idqh whose components are the high-frequency currents idh, iqh is provided as a formula (8).

$$\begin{bmatrix} i_{dh} \\ i_{qh} \end{bmatrix} = \frac{-V_h}{\omega_h(L^2 - l^2)} \begin{bmatrix} L + l\cos 2(\Delta\theta - \theta_e) & -l\sin 2(\Delta\theta - \theta_e) \\ -l\sin 2(\Delta\theta - \theta_e) & L - l\cos 2(\Delta\theta - \theta_e) \end{bmatrix} \quad (8)$$

$$\begin{bmatrix} \cos \omega_h t \\ 0 \end{bmatrix}$$

$$= \frac{-V_h}{\omega_h(L^2 - l^2)} \begin{bmatrix} L + l\cos 2(\Delta\theta - \theta_e) \\ -l\sin 2(\Delta\theta - \theta_e) \end{bmatrix} \cos \omega_h t$$

Figure 8:
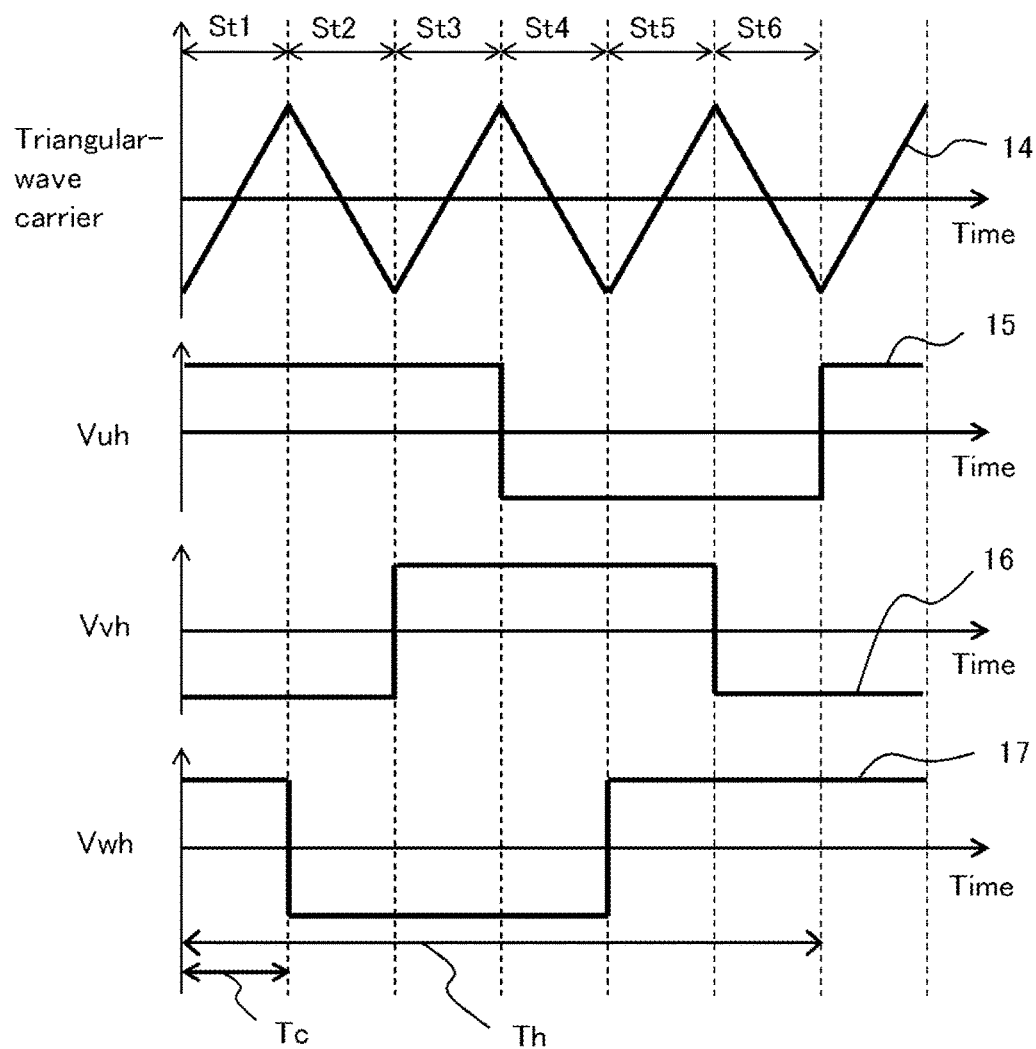
FIG. 8 is a diagram showing a relationship between a triangular wave carrier by a voltage application device and a three-phase AC voltage command for position estimation, according to Embodiment 2 of the invention.

Here, the use of amplitude components of the high-frequency currents idh, iqh in FIG. 8 makes it possible to express the estimated magnetic-pole error θe by a function of current amplitude. In this embodiment, when a current amplitude |iqh| of the component iqh perpendicular to the high-frequency current idh is used, it is possible to obtain a formula (9) from the formula (8).

$$|i_{qh}| = \frac{V_h l}{\omega_h(L^2 - l^2)} \sin 2(\Delta\theta - \theta_e) \quad (9)$$

Further, modifying the formula (9) into a formula for Δθ provides a formula (10).

$$\Delta\theta - \theta_e = \frac{1}{2}\sin^{-1}\left\{\frac{|i_{qh}|\omega_h(L^2 - l^2)}{V_h l}\right\} \quad (10)$$

The magnetic-pole position θ0 during stopping of the AC rotary machine 1 can be calculated beforehand using a calculation method described, for example, in Japanese Patent No. 4271397. Further, in Embodiment 1, mostly the AC rotary machine 1 does not rotate under application of the first voltage command (first voltage command vector V1*) and the second voltage command (second voltage command vector V2*). Thus, the dm-axis is known, and Δθ is neglectable and this allows to set Δθ=0, so that a formula (11) is obtained.

$$\theta_e = -\frac{1}{2}\sin^{-1}\left\{\frac{|i_{qh}|\omega_h(L^2 - l^2)}{V_h l}\right\} \quad (11)$$

Here, the angular frequency ωh and the high-frequency voltage amplitude Vh in the high-frequency voltage command vdh could be set arbitrarily and thus are known. Since L and l can be calculated using Ld and Lq from the formula described in the note written for the formula (5), and Ld and Lq can be recognized when they have been measured beforehand, so that L and l are also known.

In the above manner, the estimated magnetic-pole error ee that occurs due to magnetic saturation can be calculated based on |iqh|, and thus, when |iqh| under application of the second voltage command is measured, it is possible to calculate the estimated magnetic-pole error θe. The thus-calculated estimated magnetic-pole error ee is regarded as the magnetic-pole-position correction amount θe, so that the magnetic-pole-position correction amount θc can be calculated using the formula in which θe is substituted with θc. The foregoing is the principle for calculating the estimated magnetic-pole error θe and the magnetic-pole-position correction amount θc.

The voltage-vector command generation device 4 successively generates the first voltage command and the second voltage command, and outputs these voltage commands to the voltage application device 3 and the magnetic-pole-position correction amount calculation device 5. Next, description will be made about the operations of the magnetic-pole-position correction amount calculation device 5. The magnetic-pole-position correction amount calculation device 5 calculates the estimated magnetic-pole error ee and the magnetic-pole-position correction amount θc, based on the first voltage command vector V1* and the second voltage command vector V2* that are the voltage commands generated by the voltage-vector command generation device 4 and on the detection-current vector Idt outputted by the current vector detection device 2. The operations of the magnetic-pole-position correction amount calculation device 5 will be described using FIG. 2.

The magnetic-pole-position correction amount calculation device 5 includes a coordinate convertor 51, a high-frequency-component extraction unit 52, an amplitude extraction unit 53, an adder-subtractor 54 and a magnetic-pole-position correction amount calculation unit 55. Using the aforementioned magnetic-pole position θ0, the coordinate convertor 51 performs coordinate conversion of the detection-current vector Idt, namely, (iu, iv, iw), outputted by the current vector detection device 2, into currents on d-q-axis coordinates (magnetic-pole axis coordinates) according to the d-axis and the q-axis, and then outputs the dq-axis current vector Idq, that is, (ids, iqs). The components of the detection-current vector Idt are three-phase currents of iu, iv and iw, and the components of the dq-axis current vector Idq are a d-axis converted current ids and a q-axis converted current iqs.

As the high-frequency-component extraction unit 52, any type thereof may be used so far as it can extract from the dp-axis current vector (ids, iqs), a frequency component that is the same as in the second voltage command. For example, as shown in FIG. 3, by the use of a notch filter that is publicly known as a narrow bandwidth band-stop filter, the high-frequency current vector Idqh, namely, (idh, iqh) is extracted. In a notch filter 71 shown in FIG. 3, because it is a notch filter having a characteristic represented by a formula (12), filtering processing for removing an angular frequency that is the same as the angular frequency ωh of the high-frequency voltage command vector Vdqh is applied to the dq-axis current vector (ids, iqs), so that the component of the angular frequency ωh is removed from the dq-axis current vector (ids, iqs). In an adder-subtractor 72, the output of the notch filter 71 is subtracted from the dq-axis current vector (ids, iqs), so that a high-frequency current vector (idh, iqh) of the component of the angular frequency ωh is calculated from the dq-axis current vector (ids, iqs). Note that s in the formula (12) is a Laplace operator, and qx is a notch depth.

$$\frac{s^2 + \omega_h^2}{s^2 + \frac{\omega_h}{q_x}s + \omega_h^2} \quad (12)$$

In the amplitude extraction unit 53, the calculation according to a formula (13) is performed for the high-frequency current iqh, so that the magnitude of the high-frequency current iqh, namely, |iqh| that is a current amplitude, is calculated and then outputted. Note that T in the formula (13) is a cycle of the high-frequency current iqh.

$$|i_{qh}| = \sqrt{\frac{2}{T}\int_0^T i_{qh}^2 dt} \quad (13)$$

The adder-subtractor 54 subtracts the high-frequency currents idh, iqh that are the high-frequency components, from the dq-axis current vector (ids, iqs), to thereby generate a fundamental-wave current vector Idqf, namely (id, iq), that is a fundamental-wave component of the dq-axis current vector (ids, iqs). Note that, the fundamental-wave current vector (id, iq) is equal to the values of the output of the notch filter 71, and thus such values may instead be used.

The magnetic-pole-position correction amount calculation unit 55 calculates the magnetic-pole-position correction amount θc from the current amplitude |iqh| and the fundamental-wave current vector (id, iq) that is the fundamental-wave component of the dq-axis current vector (ids, iqs). First, according to the formula (11), the estimated magnetic-pole error θe is calculated using the current amplitude |iqh|. The magnitude of magnetic saturation at that time is found from the fundamental-wave current vector (id, iq), and thus can be combined with the information of id, iq and θe. Accordingly, the magnetic-pole-position correction amount calculation unit 55 can calculate the estimated magnetic-pole error θe at the time a certain rotary machine current is applied. As described previously, the voltage value of the first voltage command is changed plural times, so that plural sets of (id, iq, θe) are generated. For the correction of the magnetic-pole position, the position just has to be corrected by the estimated magnetic-pole error θe, so that the magnetic-pole-position correction amount θc is provided as the same value as that of the estimated magnetic-pole error θe. The respective values of the fundamental-wave currents id, iq and the magnetic-pole-position correction amount θc are stored in the storage device 6 provided with a memory device such as a memory or the like. Note that the fundamental-wave current vector (id, iq) is associated with the detection-current vector Idt.

Here, as the magnetic-pole-position correction amount θc that is required at the time the AC rotary machine 1 is driven in a sensorless manner, for example, a magnetic-pole-position correction amount θc that is calculated from a torque-axis-current command value iq_ref at the driving according to a formula (14), may be used. In this case, a proportional constant K is required.

$$\theta_c = K^* iq\_ref \quad (14)$$

The proportional constant K can be calculated using, for example, a least squares method, from plural number of the acquired q-axis fundamental-wave currents iq and estimated magnetic-pole errors θe. The use of the formula (14) is not limitative, and it is also possible to calculate more accurately the estimated magnetic-pole error θe or the magnetic-pole-position correction amount θc in such a manner that the calculated id, iq and θe (or θc) are retained as in a dq-axis current map (table). As the proportional constant K, a different value may be used for every specified-value region for the torque-axis-current command value iq_ref. When the AC rotary machine 1 is controlled using the formula (14), it suffices to retain a table for the plural proportional constants K and torque-axis-current command values iq_ref, so that there is a merit that the stored-data amount can be made smaller. Further, when one proportional constant K is used singly, it is not necessary to transform them into a table form, so that the stored-data amount can be made much smaller.

Further, a magnetic-pole-position correction amount that has been described as the magnetic-pole-position correction amount θc, is not limited to angle information and may be current-value information. According to International Publication No. WO2013/114688A1, for example, attention is paid to the fact that the estimated magnetic-pole error θe varies depending on the amplitude of a high-frequency q-axis current, so that current amplitude is used as a magnetic-pole-position correction amount. For this case, it suffices to regard the current amplitude |iqh| measured in this embodiment as the magnetic-pole-position correction amount, and to perform a calculation similar to that in this embodiment. It is assumed that, when the current amplitude |iqh| is regarded as the magnetic-pole-position correction amount, the symbol of the magnetic-pole-position correction amount is indicated as Ic.

Namely, even if the magnetic-pole-position correction amount to be used for the control (magnetic-pole-position correction amount θc, magnetic-pole-position correction amount Ic) is changed according to the driving control method of the AC rotary machine 1, it is possible to calculate for every control method, an optimum magnetic-pole-position correction amount (magnetic-pole-position correction amount θc, magnetic-pole-position correction amount Ic) under magnetic saturation, in such a manner that the state of magnetic saturation is changed based on the method of this embodiment and a voltage matched to the driving control state is applied according to the second voltage command, to thereby calculate a required magnetic-pole-position correction amount (magnetic-pole-position correction amount θc, magnetic-pole-position correction amount Ic).

The steps of calculation processing of the magnetic-pole-position correction amount (magnetic-pole-position correction amount θc, magnetic-pole-position correction amount Ic), according to this embodiment, will be described based on FIG. 4.

First, in Step ST01, the control device for AC rotary machine 10 determines a program counter k to have a value that is initially 0 and varies as a positive number from 0 to n, and sets target currents Id*, Iq*. "n" is a positive number of 1 or more. In this case, "n" corresponds to the number of change times in value of the target currents Id*, Iq* (set number corresponding to the desired change times). Then, by the voltage-vector command generation device 4, the first voltage command vd1*, vq1* and the second voltage command vd2*, vq2* are generated (voltage command generation step).

Then, in Step ST02, in the state where the rotor of the AC rotary machine 1 is at rest, by the voltage application device 3, the first voltage command vd1*, vq1* is applied to the AC rotary machine 1, and thereafter, the second voltage command vd2*, vq2* is applied to the AC rotary machine 1 (voltage command application step). Subsequently, in Step ST03, by the magnetic-pole-position correction amount calculation device 5, calculation of the magnetic-pole-position correction amount (magnetic-pole-position correction amount θc, magnetic-pole-position correction amount Ic) is executed (magnetic-pole-position correction amount calculation step).

Then, in Step ST04, the data of the fundamental-wave currents id, iq and the magnetic-pole-position correction amount (magnetic-pole-position correction amount θc, magnetic-pole-position correction amount Ic) that are calculated in Step ST03, is stored in the storage device 6 (data storing step). Further, the program counter k is counted up as k=k+1.

Lastly, in Step ST05, it is judged whether the calculation of the magnetic-pole-position correction amount (magnetic-pole-position correction amount θc, magnetic-pole-position correction amount Ic) has been completed n times. In this embodiment, when the value of the program counter k becomes n, the calculation processing is terminated, and if not, the flow returns to Step ST01, so that as the values of the target currents id*, Iq*, the next values are set and the processing subsequent to Step ST01 is repeated.

As described above, according to the configuration of this embodiment, the control device for AC rotary machine 10 sets a voltage command for inducing magnetic saturation as the first voltage command vd1*, vq1*; sets a voltage command for calculating the magnetic-pole-position correction amount (magnetic-pole-position correction amount θc, magnetic-pole-position correction amount Ic) as the second voltage command vd2*, vq2*; and applies the first voltage command and the second voltage command successively in a short time; so that the time for applying a rotary machine current to the AC rotary machine is reduced and thus, the magnetic-pole-position correction amount (magnetic-pole-position correction amount θc, magnetic-pole-position correction amount Ic) under magnetic saturation can be calculated without rotating the AC rotary machine 1. Further, even if the AC rotary machine 1 is in a state connected to a mechanical apparatus and thus unable to be connected to a load device or the AC rotary machine 1 is in a state unable to rotate, the control device for AC rotary machine 10 calculates a magnetic-pole-position correction amount (magnetic-pole-position correction amount θc, magnetic-pole-position correction amount Ic) to thereby control the AC rotary machine 1, based on the magnetic-pole-position correction amount (magnetic-pole-position correction amount θc, magnetic-pole-position correction amount Ic) that is associated with the detection-current vector Idt. This makes it possible to enhance the sensorless control-ability of the AC rotary machine 1. Note that, in this embodiment, the first voltage command and the second voltage command are applied successively in a short time so that Δθ that is a deviation between the d-axis and the dm-axis becomes nearly zero, and thus the axis in which alternation is caused by the second voltage command is the d-axis that is the magnetic-pole axis.

The control device for AC rotary machine 10 of Embodiment 1 comprises: the voltage-vector command generation device 4 that generates a voltage command (first voltage command Vd1*, Vq1*, second voltage command Vd2*, Vq2*) for controlling the AC rotary machine 1; the voltage application device 3 that applies a voltage to the AC rotary machine 1, based on the voltage command (first voltage command Vd1*, Vq1*, second voltage command Vd2*, Vq2*); the current vector detection device 2 that detects the detection-current vector Idt whose component is a rotary machine current (three-phase currents iu, iv, iw) flowing through the AC rotary machine 1; the magnetic-pole-position correction amount calculation device 5 that, at the time of correction-amount-generation operation of the AC rotary machine that is different to normal operation thereof, calculates a magnetic-pole-position correction amount (magnetic-pole-position correction amount θc, magnetic-pole-position correction amount Ic) for correcting a magnetic-pole position error (estimated magnetic-pole error θe) that corresponds to a difference between an estimated position that is an estimated magnetic-pole position of the rotor of the AC rotary machine 1 corresponding to the voltage command (first voltage command Vd1*, Vq1*, second voltage command Vd2*, Vq2*) and a magnetic-pole position of the rotor when the AC rotary machine 1 is driven based on the voltage command (first voltage command Vd1*, Vq1*, second voltage command Vd2*, Vq2*); and the storage device 6 in which the magnetic-pole-position correction amount (magnetic-pole-position correction amount θc, magnetic-pole-position correction amount Ic) is stored. The control device for AC rotary machine 10 of Embodiment 1 is characterized in that: the magnetic-pole-position correction amount calculation device 5 calculates the magnetic-pole-position correction amount (magnetic-pole-position correction amount θc, magnetic-pole-position correction amount Ic), based on the detection-current vector Idt that is detected when the voltage application device 3 applies a voltage to the AC rotary machine 1 according to the voltage command (first voltage command Vd1*, Vq1*, second voltage command Vd2*, Vq2*), and on the voltage command (first voltage command Vd1*, Vq1*, second voltage command Vd2*, Vq2*), and then stores in the storage device 6, the magnetic-pole-position correction amount (magnetic-pole-position correction amount θc, magnetic-pole-position correction amount Ic) as it is associated with the detection-current vector Idt; and, at the time of the normal operation of the AC rotary machine 1, the voltage-vector command generation device 4 generates the voltage command to be used for the normal operation, based on the detection-current vector Idt detected by the current vector detection device 2, and on the magnetic-pole-position correction amount (magnetic-pole-position correction amount θc, magnetic-pole-position correction amount Ic) associated with that detection-current vector Idt. Because of having the above characteristics, the control device for AC rotary machine 10 of Embodiment 1 can calculate the magnetic-pole-position correction amount (magnetic-pole-position correction amount θc, magnetic-pole-position correction amount Ic) for correcting the magnetic-pole position error (estimated magnetic-pole error θe) that occurs under application of the rotary machine current, without the AC rotary machine 1 being connected to a load device, and can enhance the controllability of the AC rotary machine 1 by controlling it based on a control command in which the magnetic-pole position having been estimated is corrected using the magnetic-pole-position correction amount (magnetic-pole-position correction amount θc, magnetic-pole-position correction amount Ic).

The magnetic-pole-position correction amount calculation method of Embodiment 1 is characterized by comprising: the voltage command generation step of successively generating the first voltage command (first voltage command Vd1*, Vq1*) for causing the target currents Id*, Iq* to flow through the AC rotary machine 1, and the second voltage command (second voltage command Vd2*, Vq2*) for calculating a magnetic-pole-position correction amount (magnetic-pole-position correction amount θc, magnetic-pole-position correction amount Ic) in an inductance state of the AC rotary machine 1 according to the first voltage command (first voltage command Vd1*, Vq1*); the voltage command application step of applying the first voltage command and the second voltage command, successively to the AC rotary machine in an application time set so that a torque current is not generated in the AC rotary machine; and the magnetic-pole-position correction amount calculation step of calculating the magnetic-pole-position correction amount (magnetic-pole-position correction amount θc, magnetic-pole-position correction amount Ic), based on the first voltage command (first voltage command Vd1*, Vq1*) and the second voltage command (second voltage command Vd2*, Vq2*), and on the detection-current vector Idt detected by the current vector detection device 2 when voltages according to the first voltage command (first voltage command Vd1*, Vq1*) and the second voltage command (second voltage command Vd2*, Vq2*) are applied to the machine. Because of having the above characteristics, the magnetic-pole-position correction amount calculation method of Embodiment 1 makes it possible to calculate the magnetic-pole-position correction amount (magnetic-pole-position correction amount θc, magnetic-pole-position correction amount Ic) for correcting the magnetic-pole position error (estimated magnetic-pole error θe) that occurs under application of the rotary machine current, without the AC rotary machine 1 being connected to a load device. According to the magnetic-pole-position correction amount calculation method of Embodiment 1, it is possible to enhance the controllability of the AC rotary machine 1 by controlling it based on a control command in which the magnetic-pole position having been estimated is corrected using the magnetic-pole-position correction amount (magnetic-pole-position correction amount θc, magnetic-pole-position correction amount Ic).

Embodiment 2

In Embodiment 1, there is shown a method of calculating the magnetic-pole-position correction amount (magnetic-pole-position correction amount θc, magnetic-pole-position correction amount Ic) under magnetic saturation, without using a load device or the like. Further, as a correction-amount calculation voltage that is used for calculating the magnetic-pole-position correction amount (magnetic-pole-position correction amount θc, magnetic-pole-position correction amount Ic), a commanded voltage alternating in the direction of the dm-axis is used. However, in the case where a rotary machine constant, such as L, l or the like, is used as in the formula (11) in order to calculate the estimated magnetic-pole error θe, when the rotary machine constant to be set has an error relative to an actual rotary machine constant, this may degrade the calculation accuracy of the magnetic-pole-position correction amount (magnetic-pole-position correction amount θc, magnetic-pole-position correction amount Ic). In Embodiment 2, description will be made about a method of calculating the magnetic-pole-position correction amount (magnetic-pole-position correction amount θc, magnetic-pole-position correction amount Ic) without using a rotary machine constant.

In this embodiment, the second voltage command (second voltage command vector V2*) outputted by the voltage-vector command generation device 4 is different to the above. In the following, the second voltage command and the principle for calculating the estimated magnetic-pole error ee and the magnetic-pole-position correction amount θc will be described, and then a specific configuration of the magnetic-pole-position correction amount calculation device 5 for implementing that principle will be described. Note that the other configuration is the same as in Embodiment 1, so that its description will be omitted.

Figure 7:
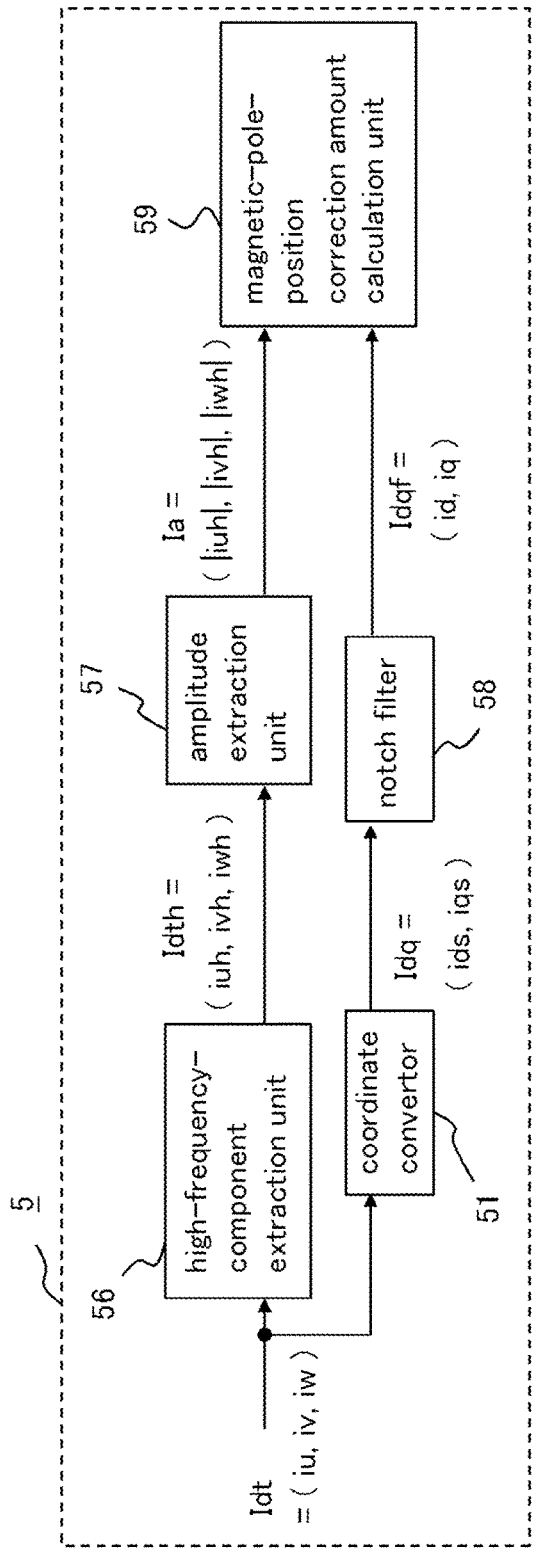
FIG. 7 is a diagram showing a configuration of a magnetic-pole-position correction amount calculation device according to Embodiment 2 of the invention.
Figure 9:
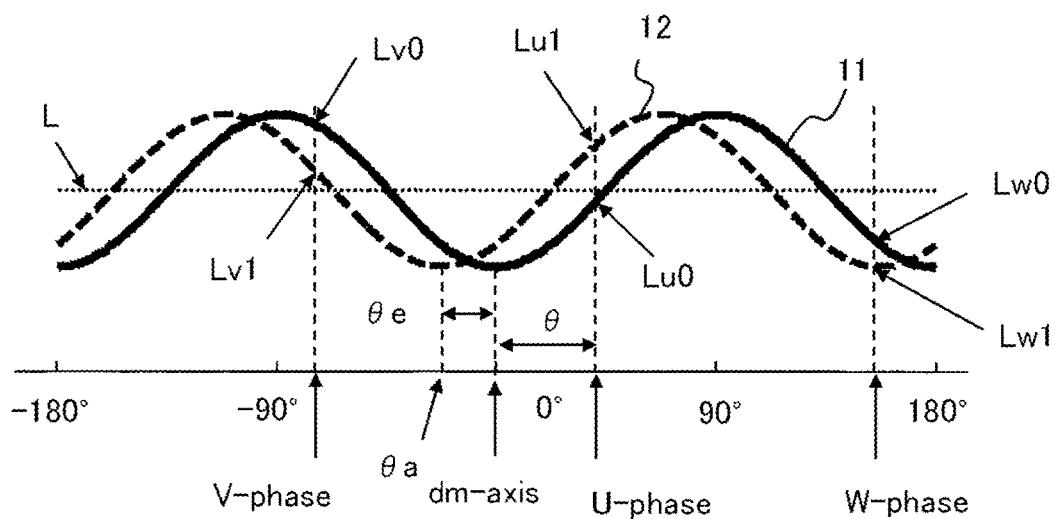
FIG. 9 is a diagram showing an inductance variation in each of UVW phases under application of a rotary machine current.
Figure 10:
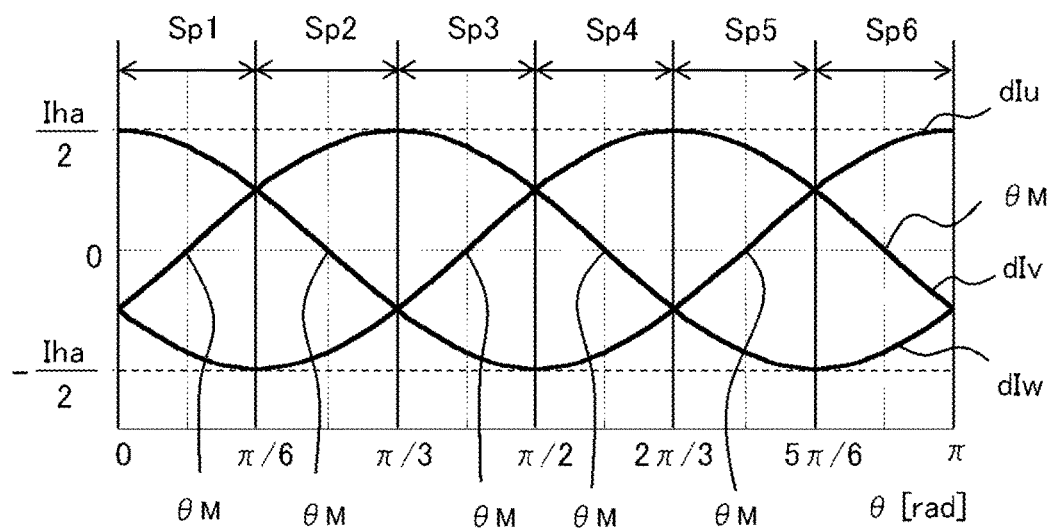
FIG. 10 is a diagram showing a variation in current amplitude with respect to a rotor position, in each of UVW phases, according to Embodiment 2 of the invention.

FIG. 7 is a diagram showing a configuration of the magnetic-pole-position correction amount calculation device according to Embodiment 2 of the invention. The voltage application device 3 according to this embodiment is a device that applies a voltage to the AC rotary machine 1 by turning ON and OFF a semiconductor switch with a given switching cycle on the basis of a voltage command such as the first voltage command, the second voltage command, or the like, that is an output by the voltage-vector command generation device 4. For example, it is a device for applying a voltage having a cycle of a triangular wave carrier as the aforementioned given switching cycle, like a publicly-known triangular-wave comparison PWM inverter. In the following, description will be made using the triangular-wave comparison PWM inverter as an example. FIG. 8 is a diagram showing a relationship between a triangular wave carrier of the voltage application device and a three-phase AC voltage command for position estimation, according to Embodiment 2 of the invention. FIG. 9 is a diagram showing an inductance variation in each of the UVW phases under application of a rotary machine current, and FIG. 10 is a diagram showing a variation in current amplitude with respect to a rotor position, in each of the UVW phases, according to Embodiment 2 of the invention.

This embodiment is characterized in that a voltage command with a frequency that is higher than the driving frequency of the AC rotary machine 1 is overlapped as the second voltage command, and from the magnitude relationship among the current values of the respective phases of U-phase, V-phase and W-phase obtained thereby, the magnetic-pole-position correction amount θc is calculated. As will be described later, because no rotary machine constant is used for the calculation of the magnetic-pole-position correction amount θc, it is possible to enhance the calculation accuracy of the magnetic-pole-position correction amount θc even when an error exists in the set rotary machine constant.

For example, the second voltage command vector V2* provided as the second voltage command, comprises signals in which, as shown in FIG. 8, when a half cycle Tc of a triangular carrier waveform 14 of the triangular-wave comparison PWM inverter provided as the voltage application device is defined as one section, six sections (St1, St2, St3, St4, St5, St6) constitute one cycle of each of the signals, wherein the signals are shifted in phase to each other by two sections therebetween in order to establish a three-phase equilibrium, namely, they are set as a U-phase pulse-voltage command waveform 15, a V-phase pulse-voltage command waveform 16 and a W-phase pulse-voltage command waveform 17. The second voltage command for the U-phase, V-phase and W-phase comprises a U-phase voltage command Vuh, a V-phase voltage command Vvh and a W-phase voltage command Vwh, respectively. In FIG. 8, the abscissa represents time, and the ordinate represents a voltage. "Th"

is a cycle of a three-phase high-frequency-voltage command vector Vuvwh, namely, (Vuh, Vvh, Vwh). Note that, in order to give the three-phase-equilibrium voltage command as described above to the AC rotary machine, its cycle is required to be set so as to correspond to a multiple of six times of the above Tc, namely, a multiple of three times of a cycle of the triangular carrier.

Here, the principle for calculating the estimated magnetic-pole error θe and the magnetic-pole-position correction amount θc in this embodiment will be described. In FIG. 9, an inductance variation in each of the phases of the AC rotary machine 1 is shown. In FIG. 9, the abscissa represents a position (electrical angle) in the AC rotary machine 1, and the ordinate represents an inductance. In FIG. 9, an inductance distribution in the case where the dm-axis of the AC rotary machine 1 is at a position apart by θ from the U-phase of the AC rotary machine 1 is shown.

First, focusing on the inductance distribution 11 under no load indicated by a solid line in the figure reveals that the inductances Lu0, Lv0, Lw0 of the respective phases of U-phase, V-phase and W-phase each vary at a frequency twice the cycle of the electrical angle of the AC rotary machine 1. Further, the UVW phases have a phase difference of 2π/3 therebetween, so that high-frequency currents iuh, ivh and iwh in the respective phases under application of a high-frequency rotation voltage having a constant amplitude, like the aforementioned second voltage command, namely, the U-phase voltage command Vuh, the V-phase voltage command Vvh and the W-phase voltage command Vwh, can be represented by a formula (15).

$$iuh = \left\{Ih + \frac{Iha}{2} \cdot \cos(2\theta)\right\} \cdot \sin(\omega_h t) \qquad (15)$$

$$ivh = \left\{Ih + \frac{Iha}{2} \cdot \cos\left(2\theta + \frac{2}{3}\pi\right)\right\} \cdot \sin\left(\omega_h t + \frac{2}{3}\pi\right)$$

$$iwh = \left\{Ih + \frac{Iha}{2} \cdot \cos\left(2\theta - \frac{2}{3}\pi\right)\right\} \cdot \sin\left(\omega_h t - \frac{2}{3}\pi\right)$$

Here, Ih is an average value of amplitudes of the current for position estimation, Iha is an amount of variation in the current for position estimation, depending on the position in the rotary machine, θ is a position (electrical angle) in the AC rotary machine 1, and ωh is an angular frequency of the position-estimation voltage command (U-phase voltage command Vuh, V-phase voltage command Vvh, W-phase voltage command Vwh).

At this time, the magnitude relationship among the high-frequency currents iuh, ivh, iwh in the respective phases can be determined uniquely using 2θ. When the high-frequency current amplitudes are extracted from the formula (15), a formula (16) is obtained. The high-frequency current amplitude in the U-phase is |iuh|, the high-frequency current amplitude in the V-phase is |ivh| and the high-frequency current amplitude in the W-phase is |iwh|.

$$|iuh| = Ih + \frac{Iha}{2} \cdot \cos(2\theta) \qquad (16)$$

$$|ivh| = Ih + \frac{Iha}{2} \cdot \cos\left(2\theta + \frac{2}{3}\pi\right)$$

$$|iwh| = Ih + \frac{Iha}{2} \cdot \cos\left(2\theta - \frac{2}{3}\pi\right)$$

Furthermore, when the average value Ih of the current amplitudes in the respective phases is subtracted from the current amplitudes |iuh|, |ivh|, |iwh| in the respective phases in the formula (16), differential currents in the respective phases are provided as a formula (17). The differential current in the U-phase is dIu, the differential current in the V-phase is dIv and the differential current in the W-phase is dIw. Note that the average value Ih of the current amplitudes in the respective phases is given from a formula (18).

$$dIu = |iuh| - Ih = \frac{Iha}{2} \cdot \cos(2\theta) \qquad (17)$$

$$dIv = |ivh| - Ih = \frac{Iha}{2} \cdot \cos\left(2\theta + \frac{2}{3}\pi\right)$$

$$dIw = |iwh| - Ih = \frac{Iha}{2} \cdot \cos\left(2\theta - \frac{2}{3}\pi\right)$$

$$Ih = \frac{|iuh| + |ivh| + |iwh|}{3} \qquad (18)$$

From the right side of the formula (17) regarding the three-phase differential currents dIu, dIv, dIw, it is found that the differential currents dIu, dIv, dIw have the same amplitude of Iha/2, and have waveforms of cos 2θ shifted in phase to each other by 2π/3, and the magnitude relationship of the three phases is uniquely determined by the cycle of 2θ. FIG. 10 is a diagram schematically showing an amount of variation in each of the differential currents dIu, dIv, dIw represented by the formula (17), with respect to the position θ in the AC rotary machine 1. In FIG. 10, the abscissa represents the position θ in the AC rotary machine 1, and the ordinate represents the amplitude of the differential current. In FIG. 10, it is found for example that, if the amplitude relationship of dIu>dIw>dIv is satisfied, a given particular position θ in the AC rotary machine 1 exists in a section Sp1.

Further, regarding the respective sections Sp1, Sp2, Sp3, Sp4, Sp5, Sp6 among the differential currents dIu, dIv, dIw, the current that is zero-crossing at the center of each of the sections is provided as a sin/−sin function centering on a zero-crossing point. For example, in the section Sp1, the differential current dIw is zero-crossing at the center of the section Sp1. Assuming that the differential current is almost linear in a section from −π/12 to π/12, linear approximation is applied thereto using a phase θM of the zero-crossing point at each section as an original point. Here, a section center phase that is the phase of the zero-crossing point at each section is defined as θM, and a deviation between the section center phase θM and the dm-axis is defined as ΔθM. The section center phase θM is the center of each section, so that it can be represented by a formula (19). The deviation ΔθM can be represented by a formula (20). Accordingly, a position θ on which attention is focused for the dm-axis, namely, the position θ of the dm-axis can be finally represented by a formula (21). Note that N in the formula (19) is an integer of 0 to 5, and here is provided N=0 for the section Sp1, N=1 for the section Sp2, N=2 for the section Sp3, N=3 for the section Sp4, N=4 for the section Sp5 and N=5 for the section Sp6. Further, dImid in the formula (20) is a middle differential-current value, which is indicative of the value of a center current of one of dIu, dIv and dIw that is zero-crossing at the center of each section. For example, in the section Sp1, the value of the differential current dIw is provided as the middle differential-current value dImid.

$$\theta_M = \frac{\pi}{6}N + \frac{\pi}{12} \qquad (19)$$

$$\Delta\theta_M = \frac{d\text{Im } id}{(Iha/2)} \qquad (20)$$

$$\theta = \theta_M + \Delta\theta_M \qquad (21)$$

Note that Iha/2 in the formula (20) may be calculated from the square root of the sum of squares of dIu, dIv and dIw as shown by a formula (22).

$$\frac{Iha}{2} = \sqrt{\frac{2(dIu^2 + dIv^2 + dIw^2)}{3}} \qquad (22)$$

In the foregoing, there is shown a method of calculating a given particular position θ in the AC rotary machine 1 under no load, based on the magnitude relationship among the current amplitudes |iuh|, |ivh|, |iwh| in the respective phase. This calculation can be made from the current amplitudes |iuh|, |ivh|, |iwh| of the currents in the respective phase of the AC rotary machine 1, and no rotary machine constant is required therefor.

Next, focusing on the inductance distribution 12 under load in FIG. 9 reveals that it differs to the distribution under no load in that the position of the dm-axis in the AC rotary machine 1 is displaced by a displacement angle θe relative to the position of the dm-axis under load, so that it is possible to express dIu, dIv, dIw under load by modifying the formula (17) into a formula (23).

$$dIu = |iuh| - Ih = \frac{Iha}{2} \cdot \cos(2(\theta - \theta_e)) \qquad (23)$$

$$dIv = |ivh| - Ih = \frac{Iha}{2} \cdot \cos\left(2(\theta - \theta_e) + \frac{2}{3}\pi\right)$$

$$dIw = |iwh| - Ih = \frac{Iha}{2} \cdot \cos\left(2(\theta - \theta_e) - \frac{2}{3}\pi\right)$$

In the formula (23), with respect to the given particular position in the AC rotary machine 1, only a change from θ to θ−θe is shown, so that, by way of the calculation steps similar to those in the case of no load, a formula (24) is obtained like the formula (21).

$$\theta - \theta_e = \theta_M + \Delta\theta_M \qquad (24)$$

Here, the given particular position θ in the AC rotary machine 1 means a position of the dm-axis and, in this embodiment, it becomes known by assigning θ=θ0 in the formula (24) when the detection of the magnetic-pole position θ0 has been executed in a stopping state of the AC rotary machine 1, as similar to in Embodiment 1. Namely, the displacement angle (estimated magnetic-pole error) θe can be calculated using the formula (25).

$$\theta_e = \theta 0 - (\theta_M + \Delta\theta_M) \qquad (25)$$

Note that, since the inductance distribution varies at a frequency twice the cycle of the electrical angle, with respect to a given load, two calculation results of θe and θe+π are provided for the displacement angle (estimated magnetic-pole error); however, when the amount of variation in the phase is assumed to be shifted on a ±90 degrees basis, the displacement angle (estimated magnetic-pole error) can be uniquely determined. As shown by the formula (25), the estimated magnetic-pole error θe can be calculated based on the deviation ΔθM calculated from the measured data under no load. Since the calculated estimated magnetic-pole error θe is regarded as the magnetic-pole-position correction amount θc, the magnetic-pole-position correction amount θc can be calculated by a formula (26) in which θe is substituted with θc.

$$\theta c = \theta 0 - (\theta M + \Delta\theta M) \qquad (26)$$

The foregoing is the principle for calculating the estimated magnetic-pole error θe and the magnetic-pole-position correction amount θc.

Next, the operations of the magnetic-pole-position correction amount calculation device 5 will be described. In FIG. 7, a configuration diagram of the magnetic-pole-position correction amount calculation device 5 is shown. A high-frequency-component extraction unit 56 extracts from the detection-current vector Idt, namely, (iu, iv, iw), a high-frequency current vector Idth, namely, (iuh, ivh, iwh) that is generated when the second voltage command is applied. The high-frequency-component extraction unit 56 is similar in configuration to the high-frequency-component extraction unit 52 in Embodiment 1 and just has to apply the processing by the high-frequency-component extraction unit 52 to (iu, iv, iw). Note that when the second voltage command is given as the waveforms in the form shown in FIG. 8, the frequency of the high-frequency component to be extracted can be given as ωh=2π/(6·Tc).

An amplitude extraction unit 57 extracts an amplitude vector Ia, namely, (|iuh|, |ivh|, |iwh|), of the high-frequency current vector (iuh, ivh, iwh). The amplitude vector Ia is a vector whose components are the amplitudes of the detection currents in the respective phases in the high-frequency current vector. The configuration of the amplitude extraction unit 57 is similar to that of the amplitude extraction unit 53 in Embodiment 1. A notch filter 58 serves to extract the fundamental-wave current vector (id, iq) resulting from removal of the high-frequency current component from the dp-axis detection-current vector, namely, the dp-axis current vector (ids, iqs), and the configuration of the notch filter 58 is similar to that of the notch filter 71.

A magnetic-pole-position correction amount calculation unit 59 calculates the estimated magnetic-pole error ee using the formula (23) and the formula (25) from the amplitude vector (|iuh|, |ivh|, |iwh|) of the UVW phases outputted by the amplitude extraction unit 57, to thereby acquire the information of (id, iq, θe). Thereafter, it suffices to calculate the magnetic-pole-position correction amount θc to be used for controlling driving of the AC rotary machine 1, like in Embodiment 1. Note that the steps for calculation processing of the magnetic-pole-position correction amount θc in this embodiment are similar to those in FIG. 4 illustrated in Embodiment 1.

This embodiment is characterized in that a voltage command with a frequency that is higher than the driving frequency of the AC rotary machine 1 is overlapped, and from the magnitude relationship among the current values in the respective UVW phases obtained thereby, the estimated magnetic-pole error θe or the magnetic-pole-position correction amount θc is calculated. According to the control device for AC rotary machine 10 of Embodiment 2, because any rotary machine constant, such as L, l or the like, is not used for the calculation of the estimated magnetic-pole error θe or the magnetic-pole-position correction amount θc, it is possible to enhance the calculation accuracy of the magnetic-pole-position correction amount θc even when the AC rotary machine is such a machine whose rotary machine constant can not be measured accurately.

Embodiment 3

In Embodiments 1 and 2, there is shown a method of calculating the magnetic-pole-position correction amount (magnetic-pole-position correction amount θc, magnetic-pole-position correction amount Ic) under magnetic saturation, by setting a voltage command for inducing magnetic saturation as the first voltage command, and a voltage command for calculating the magnetic-pole-position correction amount (magnetic-pole-position correction amount θc, magnetic-pole-position correction amount Ic) as the second voltage command, followed by applying the first voltage command and the second voltage command successively in a short time.

Meanwhile, as is described later, in the case of an AC rotary machine having so-called double saliency in which the inductance saliency varies according to the positional relationship between the rotor and the stator, the magnetic-pole-position correction amount θc is also increased/decreased depending on the rotor position, so that the magnetic-pole-position correction amount θc calculated at a given rotor position is different to the magnetic-pole-position correction amount θc calculated at another rotor position. This may cause variation in the controllability of the AC rotary machine 1.

In this embodiment, description will be described about a calculation method of the magnetic-pole-position correction amount θc, which can enhance the controllability of the rotary machine even if it is such a rotary machine in which the magnetic-pole-position correction amount θc varies depending on the rotor position.

Figure 11:
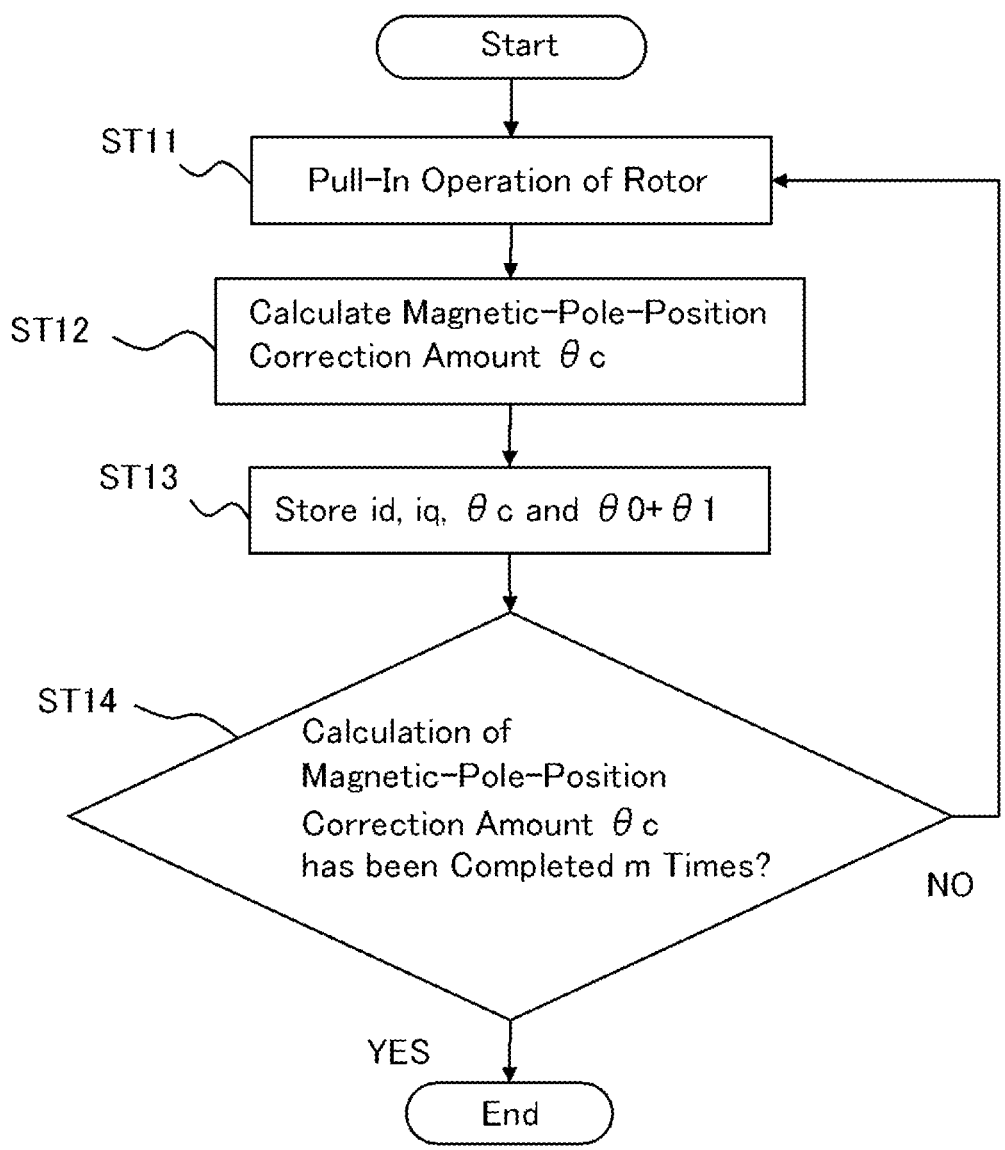
FIG. 11 is a flowchart showing magnetic-pole-position correction amount calculation processing by a control device for AC rotary machine according to Embodiment 3 of the invention.

FIG. 11 is a flowchart showing magnetic-pole-position correction amount calculation processing by the control device for AC rotary machine according to Embodiment 3 of the invention, which is a diagram showing steps of calculation processing of the magnetic-pole-position correction amount in this embodiment. First, the principle on which the inductance saliency varies according to the positional relationship between the rotor and the stator will be described, and then the steps of calculation processing of the magnetic-pole-position correction amount θc in this embodiment will be described using FIG. 11.

Initially, with respect to the principle on which the magnetic-pole-position correction amount θc of the AC rotary machine having the double saliency varies depending on the rotor position, consideration will be given for the AC rotary machine 1 in its magnetic characteristic in a separate manner for the rotor and the stator, and then a magnetic characteristic under combination of them will be described.

First, in the inductance characteristic about the rotor of the AC rotary machine 1, as shown in FIG. 5, inductance variation occurs at a frequency twice the cycle of the electrical angle, around the dm-axis as an original point. Because the position at which the inductance variation becomes minimum is displaced under magnetic saturation, it is necessary to make correction using the magnetic-pole-position correction amount θc.

Figure 12:
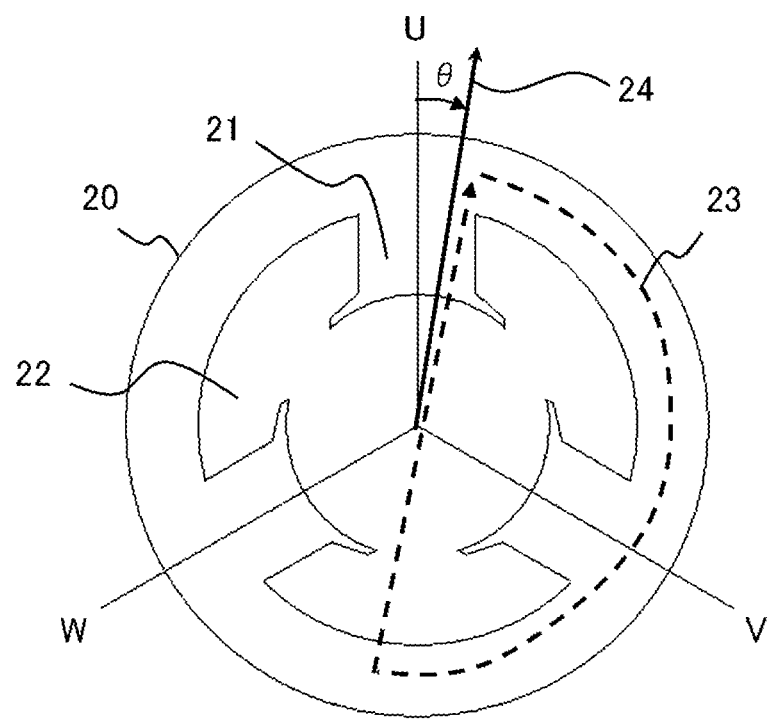
FIG. 12 is a diagram for illustrating an inductance distribution of a stator of an AC rotary machine.
Figure 13:
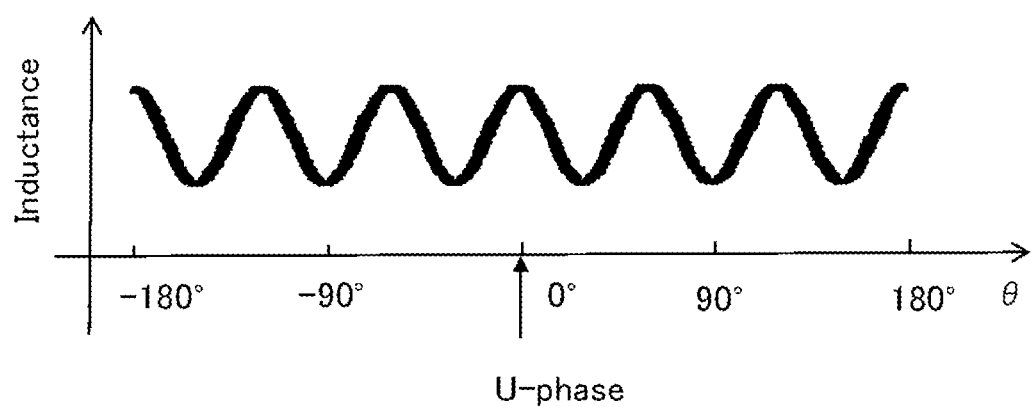
FIG. 13 is a diagram showing an inductance distribution of the stator of the AC rotary machine.

Then, the inductance characteristic about the stator of the AC rotary machine 1 is taken into consideration. FIG. 12 is a diagram for illustrating the inductance distribution of the stator of the AC rotary machine, and FIG. 13 is a diagram showing the inductance distribution of the stator of the AC rotary machine. In FIG. 12, a schematic diagram of the stator of the AC rotary machine is shown. Let's assume inductance variation in the case where a magnetic flux is generated in a θ-direction in FIG. 12. A magnetic path 23 indicated by a broken line in FIG. 12 and passing along a θ-axis 24, moves according to an angle in the θ-direction, so that, as viewed from a magnetic flux on the θ-axis 24, a portion of tooth 21 of the stator 20 and a portion of vacancy 22 where a winding is wound, alternately emerge in one cycle of the electrical angle according to the angle in the θ-direction. Since a magnetic flux is less likely to be generated at the portion of the vacancy 22, it can be said that the inductance varies according to the angle in the θ-direction, namely, the position of the θ-axis 24. Assuming that the U-phase in FIG. 12 is placed at θ=0°, the inductance variation in the case where a magnetic flux is generated in the θ-direction in FIG. 12 of the stator 20 can be expressed as in FIG. 13. In FIG. 13, the abscissa represents a position (electrical angle) in the AC rotary machine 1, and the ordinate represents an inductance. Although inductance variation occurs also in the side of the stator as mentioned above, it is found that the frequency of that variation is six times the cycle of the electrical angle as shown in FIG. 13.

Figure 14:
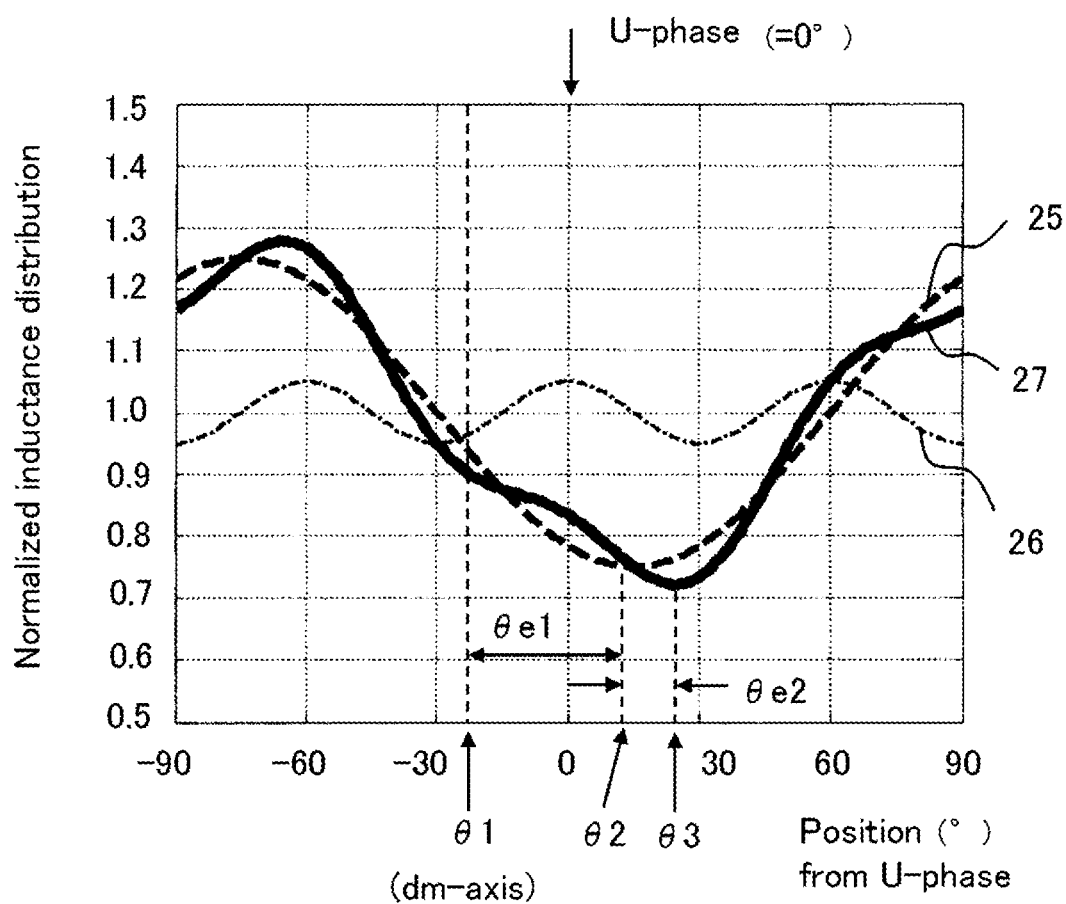
FIG. 14 is a diagram showing an inductance distribution of an AC rotary machine under application of a rotary machine current.

In consideration of the fact that inductance variation occurs both in the rotor and the stator, the inductance distribution of the AC rotary machine 1 as a whole varies as indicated by a solid line in FIG. 14. FIG. 14 is a diagram showing the inductance distribution of the AC rotary machine under application of a rotary machine current. In FIG. 14, the abscissa represents a position (electrical angle) viewed from the U-phase as a positional reference, and the ordinate represents an inductance variation (variation rate) when a reference inductance is given as 1. FIG. 14 shows distributions of a rotor inductance 25, a stator inductance 26 and a combined inductance 27 of these two inductances, at the time the inductances vary in distribution by θe1 from a position θ1 (position of the dm-axis) under magnetic saturation.

It is noted that, in FIG. 14, the respective inductances are shown when the magnetic-pole position (position of the dm-axis) is at rest in the position θ1 that is a position apart by θ1 from the U-phase. Because of magnetic saturation, the rotor inductance 25 indicated by a dotted line becomes minimum at a position (position θ2) displaced by θe1. The stator inductance 26 indicated by a dot-dash line varies in a 60° cycle, relative to the U-phase. Here, focusing on the combined inductance 27 of the two inductances indicated by the solid line reveals that the minimum value of the combined inductance 27 is provided at a position (position θ3) displaced by θe2 from the minimum position (position θ2) of the rotor inductance 25. Namely, the estimated magnetic-pole error θe is affected by the stator inductance 26 to vary from θe1 to a value of θe1+θe2. Further, because the rotor inductance 27 varies in the abscissa direction, the combined inductance 27 also varies, and in accordance therewith, the position (position θ3) of the minimum value of the combined inductance 27 also varies, so that the estimated magnetic-pole error θe varies as well. For the correction of the magnetic-pole position, the position just has to be corrected by the estimated magnetic-pole error θe, so that the magnetic-pole-position correction amount θc is provided as the same value as that of the estimated magnetic-pole error θe.

From the fact that the estimated magnetic-pole error θe and the magnetic-pole-position correction amount θc are affected by the inductance of the stator 20 to vary as described above, and in consideration of the fact that the stator 20 has inductance variation, when the magnetic-pole-position correction amount θc is calculated only at a given one magnetic-pole position, it is unable to enhance sufficiently the controllability of the AC rotary machine 1 because the magnetic-pole-position correction amount θc could not be calculated accurately. The foregoing is the principle on which the magnetic-pole-position correction amount θc varies depending on the rotor position.

For solving that problem, in this embodiment, the rotor position is changed m times and, at each magnetic-pole position, the magnetic-pole-position correction amount θc is calculated, to thereby calculate a rotor-position-dependent magnetic-pole-position correction amount θc, so that the controllability of the AC rotary machine 1 is further enhanced.

The steps of calculation processing of the magnetic-pole-position correction amount θc according to this embodiment will be described based on FIG. 11. First, in Step ST11, an operation for rotating the rotor by applying a voltage for causing it to rotate up to a position advanced by θ1 from the initial magnetic-pole position θ0 where the AC rotary machine 1 is initially at rest, namely, a pull-in operation of the rotor, is performed (rotor pull-in operation step). With respect to the position θ1, in view of the fact that the inductance variation of the stator 20 is given as a variation at a frequency six times the cycle of the electrical angle, it suffices to calculate the magnetic-pole-position correction amount θc at each electrical angle at 60 degrees interval. Accordingly, it suffices to execute the calculation m times (m is a positive number of more than 1) using a range of $0° \leq θ1 \leq 60°$. The control device for AC rotary machine 10 according to this embodiment determines the program counter k to have a value that is initially 0 and varies as a positive number from 0 to (m−1), so that θ1 is caused to vary as θ1=k×(60/m). Note that no rotor pull-in operation is required when k=0.

Then, in Step ST12, the calculation of the magnetic-pole-position correction amount θc is executed (step of generating magnetic-pole-position correction amount data). Specifically, the steps of calculation processing of the magnetic-pole-position correction amount described in the illustration of FIG. 4 in Embodiment 1 are performed. Instead, any of other methods in Embodiments 1, 2 may be used.

Then, in Step ST13, each vector data (id, iq, θc, θ0+θ1), that is data in which the magnetic-pole position (θ0+θ1) where the pulled-in rotor is at rest, is added to the fundamental-wave currents id, iq and the magnetic-pole-position correction amount θc calculated in Step ST12, is stored in the storage device 6 (data storing step). Further, the program counter k is counted up as k=k+1.

Lastly, in Step ST14, it is judged whether the calculation of the magnetic-pole-position correction amount θc has been completed m times. In this embodiment, when the value of the program counter k becomes m, the calculation processing is terminated, and if not, the flow returns to Step ST11, so that the rotor is pulled-in to the next magnetic-pole position and the processing subsequent to Step ST11 is repeated.

Each vector data (id, iq, θc, θ0+θ1) obtained by the above processing may be retained as in a table so as to be changeable according to the rotor position and the load. Further, it is allowable to determine a magnetic-pole-position correction amount θmc that is taken as an average value of the magnetic-pole-position correction amounts θc calculated by changing n times the rotor position for each current-value vector (id, iq), and then to store each vector data (id, iq, θmc, θ0+θ1) that is data of the fundamental-wave currents id, iq and the magnetic-pole-position correction amount θmc. On this occasion, since the magnetic-pole-position correction amount θmc is used as the magnetic-pole-position correction amount that is changeable according to the load, its accuracy is higher than that of the magnetic-pole-position correction amount on a single measurement basis, so that it is possible to further enhance the controllability of the AC rotary machine 1.

As described above, even when the AC rotary machine has so-called double saliency in which the magnetic-pole-position correction amount θc is increased/decreased depending on the rotor position, the control device for AC rotary machine 10 of Embodiment 3 can calculate the magnetic-pole-position correction amount θc that is changeable according to the rotor position, so that it is possible to enhance the controllability of the AC rotary machine 1 by controlling the AC rotary machine 1 using the magnetic-pole-position correction amount θc changeable according to the rotor position. Note that, like in Embodiment 1 or 2, the magnetic-pole-position correction amount is not limited to the magnetic-pole-position correction amount θc using angle information, and may be the magnetic-pole-position correction amount Ic using the amplitudes of |idh|, |iuh|, |ivh| and/or |iwh|.

The magnetic-pole-position correction amount calculation method of Embodiment 3 is characterized by comprising: the voltage command generation step of successively generating the first voltage command (first voltage command Vd1*, Vq1*) for causing the target current Id*, Iq* to flow through the AC rotary machine 1, and the second voltage command (second voltage command Vd2*, Vq2*) for calculating the magnetic-pole-position correction amount (magnetic-pole-position correction amount θc, magnetic-pole-position correction amount Ic) in an inductance state of the AC rotary machine 1 according to the first voltage command (first voltage command Vd1*, Vq1*); the voltage command application step of applying the first voltage command and the second voltage command, successively to the AC rotary machine in an application time set so that a torque current is not generated in the AC rotary machine; the magnetic-pole-position correction amount calculation step of calculating the magnetic-pole-position correction amount (magnetic-pole-position correction amount θc, magnetic-pole-position correction amount Ic), based on the first voltage command (first voltage command Vd1*, Vq1*) and the second voltage command (second voltage command Vd2*, Vq2*), and on the detection-current vector Idt detected by the current vector detection device 2 when voltages according to the first voltage command (first voltage command Vd1*, Vq1*) and the second voltage command (second voltage command Vd2*, Vq2*) are applied to the machine; and the rotor pull-in operation step of setting a position of the rotor of the AC rotary machine 1;

wherein, for each position of the rotor set in the rotor pull-in operation step, the voltage command generation step, the voltage command application step and the magnetic-pole-position correction amount calculation step are executed; and wherein, while changing plural times the position of the rotor of the AC rotary machine 1, the rotor pull-in operation step, the voltage command generation step, the voltage command application step and the magnetic-pole-position correction amount calculation step are executed. Because of having the above characteristics, even when the AC rotary machine has so-called double saliency in which the magnetic-pole-position correction amount (magnetic-pole-position correction amount θc, magnetic-pole-position correction amount Ic) is increased/decreased depending on the rotor position, the magnetic-pole-position correction amount calculation method of Embodiment 3 can calculate the magnetic-pole-position correction amount (magnetic-pole-position correction amount θc, magnetic-pole-position correction amount Ic) that is changeable according to the rotor position. According to the magnetic-pole-position correction amount calculation method of Embodiment 3, it is possible to enhance the controllability of the AC rotary machine 1 by controlling the AC rotary machine 1 using the magnetic-pole-position correction amount (magnetic-pole-position correction amount θc, magnetic-pole-position correction amount Ic) that is changeable according to the rotor position.

Figure 15:
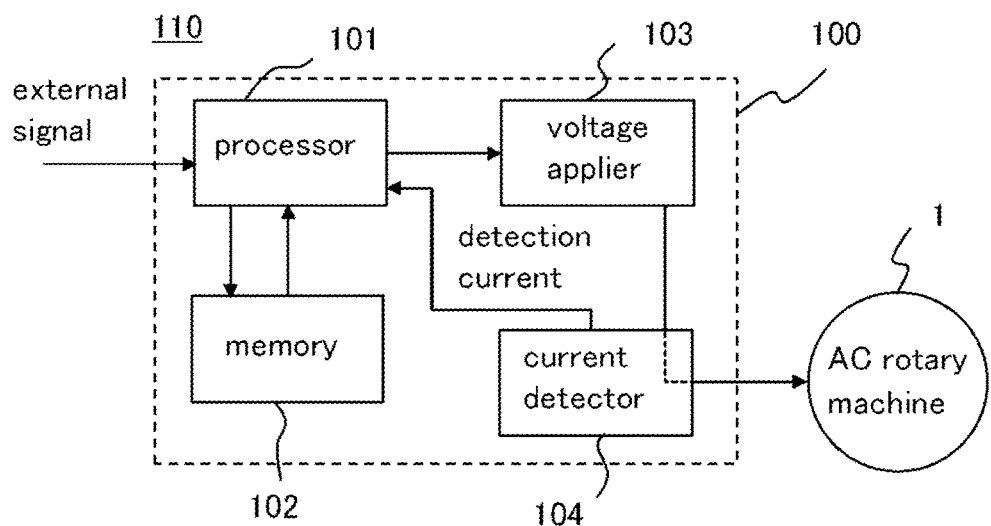
FIG. 15 is a diagram showing a hardware configuration of a driving system for AC rotary machine, according to the invention.
Figure 16:
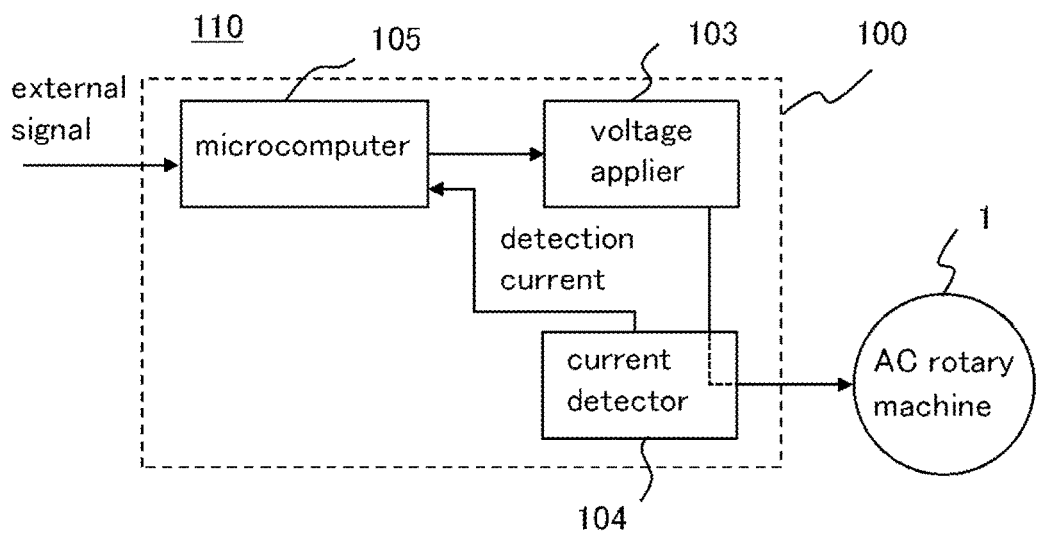
FIG. 16 is a diagram showing another hardware configuration of the driving system for AC rotary machine, according to the invention.

Note that, with respect to the voltage-vector command generation device 4 and the magnetic-pole-position correction amount calculation device 5 in the control device for AC rotary machine 10 shown in FIG. 1, their calculation processing is implemented by a processor 101 shown in FIG. 15 or a microcomputer 105 shown in FIG. 16, with the programs executed thereby. FIG. 15 is a diagram showing a hardware configuration of the driving system for AC rotary machine, according to the invention, and FIG. 16 is a diagram showing another hardware configuration of the driving system for AC rotary machine, according to the invention.

In FIG. 15 and FIG. 16, a driving system for AC rotary machine 110 includes the AC rotary machine 1 and a control device 100 for the AC rotary machine that corresponds to the control device for AC rotary machine 10. In FIG. 15 and FIG. 16, the control device 100 for the AC rotary machine is a device that is operated according to an external signal such as an analog input, an input of transmission or the like. In FIG. 15, the control device 100 for the AC rotary machine includes, as hardware, the processor 101, a memory 102, a voltage applier 103 and a current detector 104. The memory 102 is configured with a volatile storage medium such as a random access memory or the like, and a nonvolatile auxiliary storage medium such as a flash memory or the like. The memory 102 may include an auxiliary storage medium such as a hard disk or the like, in place of the nonvolatile auxiliary storage medium. The processor 101 executes a program inputted from the memory 102. In addition, the processor 101 outputs data such as a calculation result or the like to the volatile storage medium in the memory 102, or stores that data in the auxiliary storage medium through the volatile storage medium.

In addition, in FIG. 16, the control device 100 for the AC rotary machine includes, as hardware, the microcomputer 105, the voltage applier 103 and the current detector 104. The microcomputer 105 is a device provided with a processor and a memory medium. The current detector 104 corresponds to the current vector detection device 2 in FIG. 1, and is a current transformer or the like, for example. The voltage applier 103 corresponds to the voltage application device 3 in FIG. 1, and is an inverter using semiconductor switches, or the like, for example. The voltage-vector command generation device 4 and the magnetic-pole-position correction amount calculation device 5 in FIG. 1 correspond to the processor 101 in FIG. 15 or the microcomputer 105 in FIG. 16, so that their calculation processing is implemented by this hardware. Further, the storage device 6 in FIG. 1 corresponds to the memory 102 in FIG. 15 or the microcomputer 105 in FIG. 16.

Further, any combination of the respective embodiments, and any appropriate modification or omission in the embodiments may be made in the present invention without departing from the scope of the invention.

DESCRIPTION OF REFERENCE NUMERALS AND SIGNS

1: AC rotary machine, 2: current vector detection device, 3: voltage application device, 4: voltage-vector command generation device, 5: magnetic-pole-position correction amount calculation device, 6: storage device, ee: estimated magnetic-pole error, θc: magnetic-pole-position correction amount, Idt: detection-current vector, iu, iv, iw: three-phase currents, Ic: magnetic-pole-position correction amount, Id*, Iq*: target currents, Idq*: target current vector, |iuh|, |ivh|, |iwh|: current amplitudes, |iqh|: current amplitude, Vd1*, Vq1*: first voltage command, V1*: first voltage command vector, Vd2*, Vq2*: second voltage command, V2*: second voltage command vector, Vuh: U-phase voltage command, Vvh: V-phase voltage command, Vwh: W-phase voltage command.

The invention claimed is:

1. A control device for AC rotary machine, comprising:
a voltage-vector command generation device that generates a voltage command for controlling an AC rotary machine;
a voltage application device that applies a voltage to the AC rotary machine, based on the voltage command;
a current vector detection device that detects a detection-current vector whose component is a rotary machine current flowing through the AC rotary machine;
a magnetic-pole-position correction amount calculation device that, at the time of correction-amount-generation operation of the AC rotary machine that is different to normal operation thereof, calculates a magnetic-pole-position correction amount for correcting a magnetic-pole-position error that corresponds to a difference between an estimated position that is an estimated magnetic-pole position of a rotor of the AC rotary machine corresponding to the voltage command, and a magnetic-pole position of the rotor when the AC rotary machine is driven based on the voltage command;
wherein, at the time of the correction-amount-generation operation, the voltage-vector command generation device successively generates: a first said voltage command for causing a target current to flow through the AC rotary machine; and a second said voltage command that is a voltage command for applying a voltage to the AC rotary machine in a state that a current is flowing through the AC rotary machine according to the first voltage command, to calculate the magnetic-pole position correction amount in the state that the current is flowing through the AC rotary machine according to the first voltage command; and
wherein, the magnetic-pole-position correction amount calculation device calculates the magnetic-pole-position correction amount, based on the first voltage command and the second voltage command, and on the detection-current vector that is detected when voltages according to the first voltage command and the second voltage command are applied,
wherein the magnetic-pole-position correction amount calculation device calculates the magnetic-pole-position correction amount, based on an amplitude of a current resulting from converting the detection-current vector detected when the voltage application device applies the voltage to the AC rotary machine according to the second voltage command, into a magnetic-pole axis of the rotor and an axis perpendicular thereto using the magnetic-pole position.

2. The control device for AC rotary machine of claim 1, further comprising a storage device in which the magnetic-pole-position correction amount associated with the detection-current vector is stored;

wherein, at the time of the normal operation of the AC rotary machine, the voltage-vector command generation device generates the voltage command to be used for the normal operation, based on the detection-current vector detected by the current vector detection device, and on the magnetic-pole-position correction amount associated with that detection-current vector.

3. The control device for AC rotary machine of claim 2, wherein, at the time the magnetic-pole-position correction amount is calculated, the voltage-vector command generation device changes plural times a position of the rotor of the AC rotary machine, and for each different position of the rotor, the voltage-vector command generation device successively generates a first said voltage command for causing a target current to flow through the AC rotary machine, and a second said voltage command for calculating the magnetic-pole-position correction amount in a state that a current is flowing through the AC rotary machine according to the first voltage command, such that their corresponding voltages are applied to the AC rotary machine; and the magnetic-pole-position correction amount calculation device calculates the magnetic-pole-position correction amount, based on the first voltage command and the second voltage command, and on the detection-current vector detected when the voltages according to the first voltage command and the second voltage command are applied, and then stores in the storage device, the magnetic-pole-position correction amount associated with the detection-current vector and the position of the rotor.

4. The control device for AC rotary machine of claim 2, wherein, at the time the magnetic-pole-position correction amount is calculated, the voltage-vector command generation device changes plural times a position of the rotor of the AC rotary machine that is a three-phase AC rotary machine, and for each different position of the rotor, the voltage-vector command generation device successively generates the first voltage command for causing the target current to flow through the AC rotary machine, and the second voltage command for calculating the magnetic-pole-position correction amount in a state that the current is flowing through the AC rotary machine according to the first voltage command, such that their corresponding voltages are applied to the AC rotary machine, the second voltage command comprising voltage commands with phases having a phase difference of 120° to each other and a same frequency; and the magnetic-pole-position correction amount calculation device calculates the magnetic-pole-position correction amount, based on the first voltage command and the second voltage command, and on the detection-current vector detected when the voltages according to the first voltage command and the second voltage command are applied, and then stores in the storage device, the magnetic-pole-position correction amount associated with the detection-current vector and the position of the rotor.

5. The control device for AC rotary machine of claim 2, wherein the first voltage command is a voltage command that causes a current necessary to induce magnetic saturation in the AC rotary machine to flow therethrough.

6. The control device for AC rotary machine of claim 2, wherein the first voltage command is a voltage command that causes a current to flow in one direction through the AC rotary machine.

7. The control device for AC rotary machine of claim 1, wherein the first voltage command is a voltage command that causes a current necessary to induce magnetic saturation in the AC rotary machine to flow therethrough.

8. The control device for AC rotary machine of claim 1, wherein the first voltage command is a voltage command that causes a current to flow in one direction through the AC rotary machine.

9. The control device for AC rotary machine of claim 1, wherein, when the rotary machine current caused by application of the voltage according to the first voltage command is flowing through the AC rotary machine, the voltage according to the second voltage command is applied to the AC rotary machine.

10. The control device for AC rotary machine of claim 1, wherein the second voltage command is a voltage command for applying a bidirectional voltage having a phase difference of more than 90° but less than 270° in the AC rotary machine.

11. The control device for AC rotary machine of claim 10, wherein the second voltage command is a voltage command for applying the bidirectional voltage having a phase difference of 180° in the AC rotary machine.

12. The control device for AC rotary machine of claim 1, wherein the AC rotary machine is a three-phase AC rotary machine; and wherein the second voltage command comprises voltage commands with phases having a phase difference of 120° to each other and a same frequency.

13. The control device for AC rotary machine of claim 12, wherein the voltage application device is a device that applies a voltage to the AC rotary machine by turning ON and OFF a semiconductor switch in an arbitrary switching cycle; and wherein the second voltage command has a cycle that corresponds to a multiple of three times the switching cycle.

14. The control device for AC rotary machine of claim 12, wherein the magnetic-pole-position correction amount calculation device calculates the magnetic-pole-position correction amount, based on a current amplitude of the detection-current vector, that is included in the detection-current vector detected when the second voltage command is applied and that has a cycle same as that of the second voltage command.

15. A magnetic-pole-position correction amount calculation method comprising, at the time an AC rotary machine is to be driven based on a voltage command:

successively generating a first voltage command for causing a target current to flow through the AC rotary machine, and a second voltage command for calculating a magnetic-pole-position correction amount in a state that a current is flowing through the AC rotary machine according to the first voltage command;

said magnetic-pole-position correction amount being for correcting a magnetic-pole-position error that corresponds to a difference between an estimated position that is an estimated magnetic-pole position of a rotor of the AC rotary machine corresponding to the voltage command, and a magnetic-pole position of the rotor when the AC rotary machine is driven;

applying the first voltage command and the second voltage command, successively to the AC rotary machine; and calculating the magnetic-pole-position correction amount, based on the first voltage command and the second voltage command, and on a detection-current vector detected by a current vector detection device when voltages according to the first voltage command and the second voltage command are applied, wherein, in applying the first voltage command and the second voltage command, the second voltage command is applied in a state that the current is flowing through the AC rotary machine according to the first voltage command, and in the magnetic-pole-position correction amount calculation, the magnetic-pole-position correction amount is calculated, based on an amplitude of a current resulting from converting the detection-current vector detected when the voltage is applied to the AC rotary machine according to the second voltage command, into a magnetic-pole axis of the rotor and an axis perpendicular thereto using the magnetic-pole position.

16. The magnetic-pole-position correction amount calculation method of claim 15, wherein the first voltage command is a voltage command that causes a current necessary to induce magnetic saturation in the AC rotary machine to flow therethrough.

17. The magnetic-pole-position correction amount calculation method of claim 15, wherein the second voltage command is a voltage command for applying a bidirectional voltage having a phase difference of more than 90° but less than 270° in the AC rotary machine.

18. The magnetic-pole-position correction amount calculation method of claim 17, wherein the second voltage command is a voltage command for applying a bidirectional voltage having a phase difference of 180° in the AC rotary machine.

19. The magnetic-pole-position correction amount calculation method of claim 15, further comprising a rotor pull-in operation step of setting a position of the rotor of the AC rotary machine;

wherein, for each position of the rotor set in the rotor pull-in operation step, the voltage command generation step, the voltage command application step, and the magnetic-pole-position correction amount calculation step are executed; and wherein, while changing plural times the position of the rotor of the AC rotary machine, the rotor pull-in operation step, the voltage command generation step, the voltage command application step, and the magnetic-pole-position correction amount calculation step are executed.

20. A control device for an AC rotary machine, comprising:

a voltage-vector command generation device that generates a voltage command for controlling the AC rotary machine;

a voltage application device that applies a voltage to the AC rotary machine, based on the voltage command;

a current vector detection device that detects a detection-current vector whose component is a rotary machine current flowing through the AC rotary machine;

a magnetic-pole-position correction amount calculation device that, at the time of correction-amount-generation operation of the AC rotary machine that is different to normal operation thereof, calculates a magnetic-pole-position correction amount for correcting a magnetic-pole-position error that corresponds to a difference between an estimated position that is an estimated magnetic-pole position of a rotor of the AC rotary machine corresponding to the voltage command, and a magnetic-pole position of the rotor when the AC rotary machine is driven based on the voltage command;

wherein, at a time of the correction-amount-generation operation, the voltage-vector command generation device successively generates: a first voltage command for causing a target current to flow through the AC rotary machine; and a second voltage command that is a voltage command for applying a voltage to the AC rotary machine in a state that a current is flowing through the AC rotary machine according to the first voltage command, to calculate the magnetic-pole position correction amount in the state that the current is flowing through the AC rotary machine according to the first voltage command;

wherein the AC rotary machine is a three-phase AC rotary machine;

wherein the second voltage command comprises voltage commands with phases having a phase difference of 120° to each other and a same frequency; and wherein the magnetic-pole-position correction amount calculation device calculates the magnetic-pole-position correction amount, based on the first voltage command and the second voltage command, and on a middle-amplitude differential current among differential currents of respective phases that are currents obtained such that:

current amplitudes of the respective phases of components that are included in the detection-current vector detected when voltages according to the first voltage command and the second voltage command are applied, and that have a frequency same as that of the second voltage command, are subtracted respectively by an average value of the current amplitudes of the respective phases.

\* \* \* \* \*